(12) United States Patent
Ahn

(10) Patent No.: US 11,416,026 B2
(45) Date of Patent: Aug. 16, 2022

(54) WEARABLE ELECTRONIC DEVICE

(71) Applicant: Samsung Electronics Co., Ltd., Suwon-si (KR)

(72) Inventor: Kyoungjin Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 16/981,233

(22) PCT Filed: Dec. 27, 2018

(86) PCT No.: PCT/KR2018/016741
§ 371 (c)(1),
(2) Date: Sep. 15, 2020

(87) PCT Pub. No.: WO2019/182232
PCT Pub. Date: Sep. 26, 2019

(65) Prior Publication Data
US 2021/0041909 A1 Feb. 11, 2021

(30) Foreign Application Priority Data
Mar. 19, 2018 (KR) .................. 10-2018-0031734

(51) Int. Cl.
*G06F 1/16* (2006.01)
*G02B 27/01* (2006.01)
*G06F 3/01* (2006.01)

(52) U.S. Cl.
CPC .......... *G06F 1/163* (2013.01); *G02B 27/0176* (2013.01); *G06F 3/011* (2013.01)

(58) Field of Classification Search
CPC ........ G06F 1/163; G06F 1/181; G06F 1/1658; G06F 1/1662; G06F 3/011; G06T 19/006;
(Continued)

(56) References Cited

U.S. PATENT DOCUMENTS

2010/0095438 A1 4/2010 Moelker
2012/0138647 A1 6/2012 Norling
(Continued)

FOREIGN PATENT DOCUMENTS

CN 108205202 * 1/2018 ............. G02B 27/00
EP 1924894 B1 12/2013
(Continued)

OTHER PUBLICATIONS

International Search Report and Written Opinion of the International Searching Authority in connection with International Application No. PCT/KR2018/016741 dated Mar. 29, 2019, 10 pages.
(Continued)

*Primary Examiner* — Zachary Pape
*Assistant Examiner* — Amir A Jalali

(57) ABSTRACT

The various embodiments disclosed in the present document relate to wearable electronic devices. A wearable electronic device can be provided, according to various embodiments of the present document, comprising: a housing for accommodating electronic components; at least one band; and a connector, a relative position of which can be adjusted with respect to the band, wherein the connector comprises: a connector housing; a spur gear engaged with at least a portion of the band; a wheel disposed inside the connector housing, coaxial with the spur gear, and at least partially exposed to the outside of the connector housing; a circular plate coaxial with the wheel and of which at least a portion is inserted into a circular recess formed in the wheel; and a first pawl of which at least a portion is inserted into a recess guide channel formed in the circular plate and which engages along the inner circumferential surface of the circular recess. In addition, various other embodiments can be implemented.

15 Claims, 17 Drawing Sheets

(58) Field of Classification Search
CPC ........ G02B 2027/0178; G02B 27/0176; G02B 27/02; G02B 27/017; H05K 7/14; H05K 5/00; H04N 5/64; H04N 13/00; A42B 1/22
See application file for complete search history.

(56) References Cited

U.S. PATENT DOCUMENTS

| | | |
|---|---|---|
| 2015/0250251 A1 | 9/2015 | Ahlgren et al. |
| 2015/0316773 A1* | 11/2015 | Tazbaz ............... G02B 27/0179 359/630 |
| 2017/0045910 A1 | 2/2017 | Lee et al. |
| 2017/0048994 A1 | 2/2017 | Lee |
| 2018/0003984 A1* | 1/2018 | Lai .................... A42B 7/00 |
| 2018/0027676 A1 | 1/2018 | Araki et al. |
| 2018/0152213 A1* | 5/2018 | Lee .................... H04B 1/385 |
| 2018/0364490 A1* | 12/2018 | Lin .................... G02B 27/0176 |
| 2019/0159354 A1* | 5/2019 | Zheng ................ G02B 27/01 |
| 2019/0220056 A1* | 7/2019 | Yan .................... G06F 1/163 |

FOREIGN PATENT DOCUMENTS

| | | |
|---|---|---|
| EP | 3264748 A1 | 1/2018 |
| KR | 10-2011-0079834 A | 7/2011 |
| KR | 10-1150518 B1 | 5/2012 |
| KR | 10-2014-0131636 A | 11/2014 |
| KR | 10-2016-0082190 A | 7/2016 |
| KR | 10-2017-0011320 A | 2/2017 |
| KR | 10-2017-0020149 A | 2/2017 |
| KR | 10-2017-0020226 A | 2/2017 |
| NO | 2016136657 A1 | 9/2016 |
| WO | 2007030953 A1 | 3/2007 |

OTHER PUBLICATIONS

Supplementary European Search Report dated Mar. 22, 2021 in connection with European Patent Application No. 18 91 0875, 6 pages.
Korean Intellectual Property Office, "Decision of Grant" issued Apr. 27, 2022, in connection with Korean Patent Application No. 10-2018-0031734, 7 pages.

* cited by examiner

[ Combination ]

WEARABLE ELECTRONIC DEVICE

CROSS-REFERENCE TO RELATED APPLICATIONS

This application is a National Phase Entry of PCT International Application No. PCT/KR2018/016741, which was filed on Dec. 27, 2018 and claims priority to Korean Patent Application No. 10-2018-0031734, which was filed on Mar. 19, 2018 in the Korean Intellectual Property Office, the contents of which are incorporated herein by reference.

BACKGROUND

1. Field

Various embodiments disclosed in this document relate to a wearable electronic device.

2. Description of the Related Art

Electronic devices to be carried, such as electronic wallets, portable multimedia players, mobile communication terminals, and tablet PCs, are normally equipped with flat display devices and batteries, and usually have bar-type, folder-type, or sliding-type exteriors due to the shape of the display devices or the batteries. In line with recent improvement of the performance of display devices and batteries, as well as compactness thereof, electronic devices that can be worn on a part of a human body (for example, wrist or head) have appeared.

In order to make an electronic device wearable on a part of a human body, the user needs to be able to easily manipulate a fastening portion (for example, strap or band) for wearing the electronic device on a part of a human body.

SUMMARY

In order to put on an electronic device on a part of a human body, a wheel may be used to tighten or loosen the same, a button provided on the electronic device may be pressed to loosen the same, or other methods are currently employed.

In the case of a conventional electronic device having a band, the length of which can be adjusted by rotating a wheel, a device for tightening the wheel and a device for loosening the wheel are provided separately, and this may degrade user convenience.

According to some embodiments, in the case of an electronic device having a wheel, the user may rotate the wheel in a direction different from the direction designated to tighten the wheel or the direction designated to loosen the wheel. In this case, the band may be tightened or loosened unwittingly, thereby inconveniencing the user.

According to some embodiments, in the case of an electronic device having a button designed such that the length can be adjusted only by pressing the button for a long time, the user may find it inconvenient.

Various embodiments disclosed in this document may provide a wearable electronic device free from various inconveniences.

Various embodiments disclosed in this document may provide a wearable electronic device having a band, the length of which can be easily adjusted.

Various embodiments disclosed in this document may provide a wearable electronic device which can be easily manipulated even by one hand.

According to various embodiments disclosed in this document, there may be provided a wearable electronic device including: a housing containing electronic components; and a band structure, wherein the band structure includes: a first band including a first end portion connected to a first region of the housing and a second end portion including a first rack gear; a second band including a third end portion connected to a second region of the housing and a fourth end portion including a second rack gear parallel to the first rack gear; and an adjustable connector moveably engaged with the second end portion and the fourth end portion, such that the housing, the first band, the connector, and the second band together form a closed loop, wherein the connector includes: a connector housing structure; a spur gear disposed inside the connector housing structure, wherein the spur gear is positioned between the first rack gear and the second rack gear so as to rotatably engage therewith; and a wheel coaxial with the spur gear and partially exposed through the connector housing structure to be able to rotate from outside the connector housing structure, wherein the wheel includes: a first surface facing the first rack gear and the second rack gear; and a second surface facing away from the first surface, wherein the second surface includes a circular recess forming an annular inner wall including a first annular portion, wherein the first annular portion includes a first recessed cam structure and a second recessed cam structure disposed in opposite directions, each of the first recessed cam structure and the second recessed cam structure having symmetric edges, wherein the connector housing structure includes a second annular portion, the second annular portion forming an inner ratchet ring including asymmetric ratchet teeth having a first edge with a first slope and a second edge with a second slope larger than the first slope, a circular plate at least partially disposed in the circular recess, wherein the circular plate is coaxially connected to the spur gear, and includes a recess guide channel extending in a diameter direction of the circular plate, a first pawl configured to be moveable in the diameter direction inside the guide channel between the first recessed cam structure and the second recessed cam structure, wherein the first pawl includes a first end surface, wherein the first end surface includes: a first portion having a first shape corresponding to and engaged with the first recessed cam structure; and a second portion having a second shape corresponding to and engaged with one of the asymmetric ratchet teeth, a second pawl configured to be moveable in the diameter direction inside the guide channel between the first pawl and the second recessed cam structure, wherein the second pawl includes a second end surface, wherein the second end surface includes: a third portion having a third shape corresponding to and engaged with the second recessed cam structure; and a fourth portion having the second shape, wherein the ratchet ring, the second portion, and the fourth portion are configured to allow the wheel to rotate in a first rotation direction and to prevent the wheel from rotating in a second rotational direction opposite to the first rotational direction, and wherein the first recessed cam structure, the second recessed cam structure, the first portion, and the second portion are configured to allow the wheel to rotate in the second rotational direction by means of a force acting such that the first pawl and the second pawl move away from the ratchet ring.

According to various embodiments disclosed in this document, there may be provided a wearable electronic device including: a housing containing electronic components; at least one band; and a connector capable of adjusting a relative position with the band, wherein the connector includes: a connector housing; a spur gear engaging with at least a part of the band; a wheel which is disposed inside the connector housing, which is coaxial with the spur gear, and which is at least partially exposed to the outside of the connector housing; a circular plate which is coaxial with the wheel, and which is at least partially inserted into a circular recess formed on the wheel; and a first pawl at least partially inserted into a recess guide channel formed on the circular plate so as to correspond to and engage with the shape of the inner peripheral surface of the circular recess.

According to various embodiments disclosed in this document, there may be provided a wearable electronic device including: at least one band; and a connector capable of adjusting a relative position with the band, wherein the connector includes a ratchet structure having asymmetric ratchet teeth and a recess cam structure having a symmetric edge, and wherein the connector includes a first pawl, a part of which corresponds to and engages with the ratchet structure, and at least another part of which engages with the recess cam structure.

According to various embodiments disclosed in this document, length adjustment during tightening and length adjustment during loosening can be simultaneously performed with a single wheel, thereby providing convenience in connection with adjusting the length of a wearable electronic device.

According to various embodiments, a release button unit may be additionally provided, which can be used for rapid untightening.

DETAILED DESCRIPTION

Figure 1:
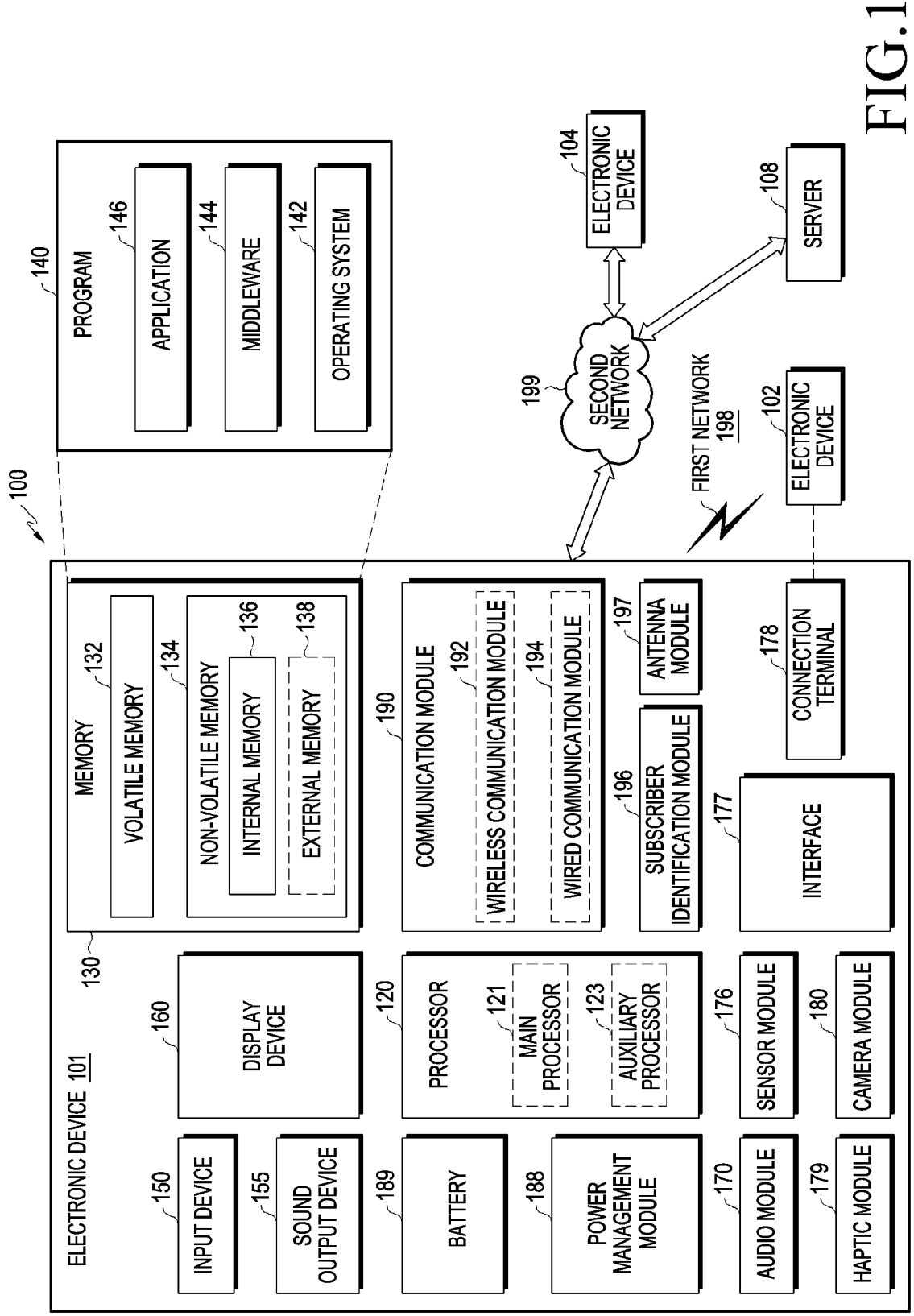
FIG. 1 is a block diagram of an electronic device inside a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
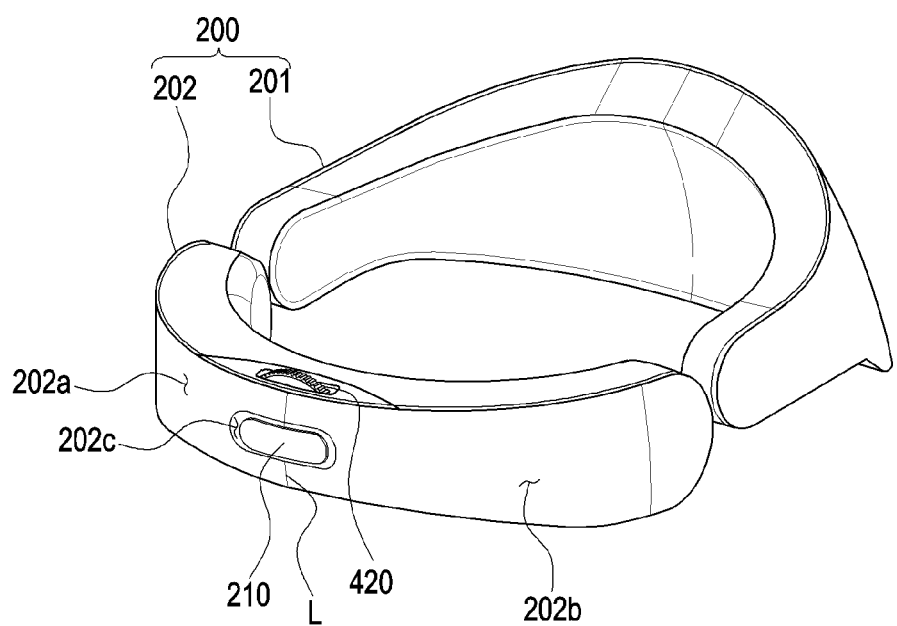
FIG. 2 is a perspective view of a wearable electronic device according to various embodiments disclosed in this document.

FIG. 2 is a perspective view of a wearable electronic device (for example, 101 in FIG. 1) according to various embodiments disclosed in this document. The wearable electronic device (for example, 101 in FIG. 1) according to various embodiments disclosed in this document may include a housing 200 configured to contain electronic components and a band structure 300.

Referring to FIG. 2, the housing 200 may constitute the exterior regarding at least a part of the wearable electronic device 101, and may be shaped such that the same can be mounted on a part of a human body. For example, the housing 200 may have a cap-type or band-type shape such that, when a human head is positioned at the center part of the housing 200, the housing 200 surrounds the head.

According to various embodiments, as illustrated in FIG. 2, the housing 200 may be configured to include a means (for example, band structure) for adjusting the dimension (or length) of the housing 200 therein. According to an embodiment, the housing 200 may be made of various materials in various types. For example, the housing 200 may be formed such that components included therein can move relative to each other or can undergo shape changes, by using a woven material, leather, rubber, urethane, metal, ceramic, shape-memory alloy, or a combination of at least one or two of the above materials. According to an embodiment, the housing 200 may be configured to have a closed outer surface as illustrated in FIG. 2, but is not necessarily limited thereto. For example, unlike what is illustrated in the diagram, the housing 200 may have one or more segmented portions formed in the longitudinal direction thereof, or may be formed in an open type such that one end of the housing 200 and the other end thereof are spaced apart from each other.

According to an embodiment, the housing 200 may include a front housing 201 and a rear housing 202. For example, a means (for example, band structure) for adjusting the dimension (or length) of the housing 200 may be at least partially contained in the front housing 201 or the rear housing 202. According to an embodiment, when a wearable electronic device (for example, 101 in FIG. 1) disclosed in this document is a head-mounted wearable electronic device, the means (for example, band structure) for adjusting the dimension (or length) of the housing 200 may be contained in the rear housing 202.

According to various embodiments, the rear housing 202 may include a first region 202a on the left side and a second region 202b on the right side, with reference to a virtual center line L formed in the rearmost region. When the means (for example, band structure) for adjusting the dimension (or length) of the housing 200 is at least partially contained in the rear housing 202, the end of one side of the means (for example, band structure) may be positioned in the first region 202a, and the end of the other side thereof may be positioned in the second region 202b. According to an embodiment, a third region 202c may be formed between the first region 202a and the second region 202b, and a button unit 210 may be provided in the third region 202c. According to an embodiment, a release spring 220 may be additionally provided between the third region 202c and the button unit 210, thereby tensioning the button unit 210. After the button unit 210 is manipulated by the user, the button unit 210 may be returned to the original state by the release spring 220.

Figure 3:
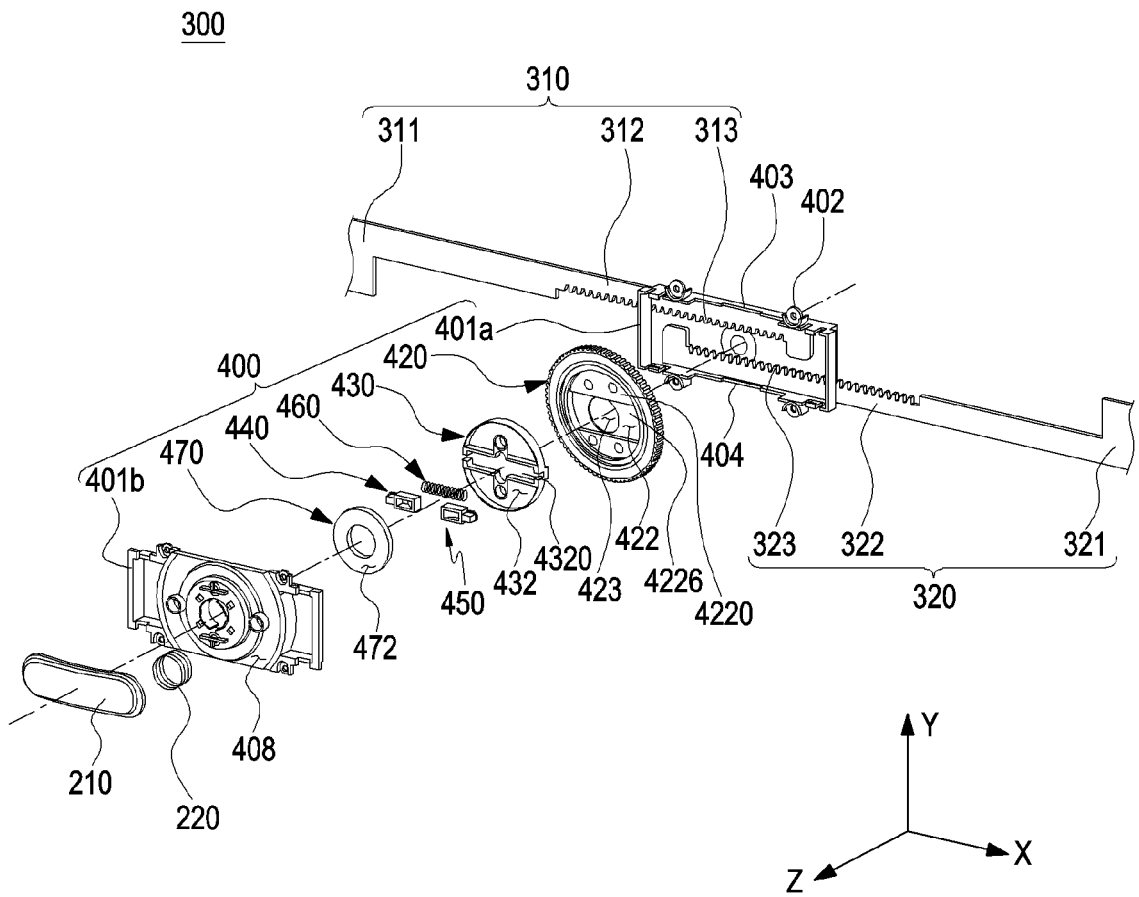
FIG. 3 is an exploded perspective view of a band structure according to various embodiments disclosed in this document.
Figure 4A:
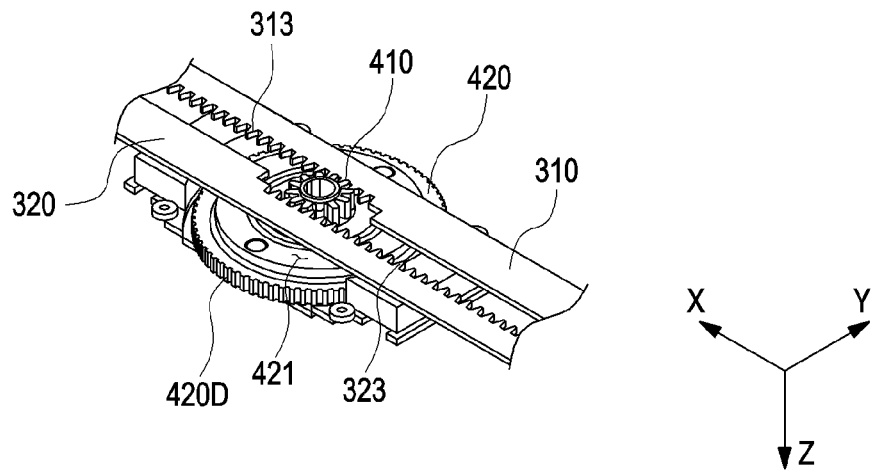
FIG. 4A is a diagram illustrating a coupling relation between a first band, a second band, and a spur gear according to various embodiments disclosed in this document.
Figure 4B:
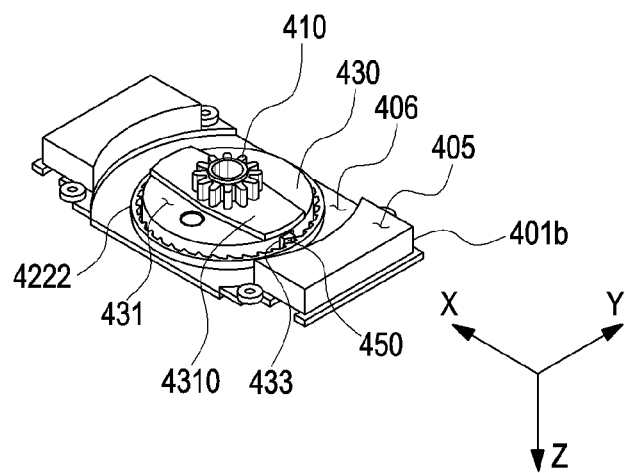
FIG. 4B is a diagram illustrating a coupling relation between a spur gear, a circular plate, and a connector housing structure according to various embodiments disclosed in this document.
Figure 4C:
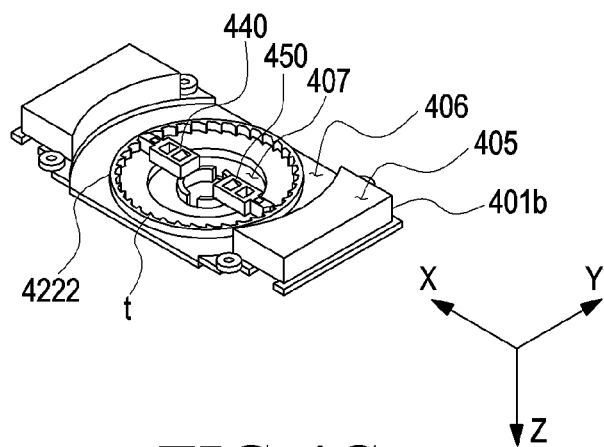
FIG. 4C is a diagram illustrating a coupling relation between a first pawl, a second pawl, and a connector housing structure according to various embodiments disclosed in this document.

FIG. 3 is an exploded perspective view of a band structure 300 according to various embodiments disclosed in this document. FIG. 4A is a diagram illustrating a coupling relation between a first band 310, a second band 320, and a spur gear 410 according to various embodiments disclosed in this document. FIG. 4B is a diagram illustrating a coupling relation between a spur gear 410, a circular plate 430, and a connector housing structure 401 according to various embodiments disclosed in this document. FIG. 4C is a diagram illustrating a coupling relation between a first pawl 440, a second pawl 450, and a connector housing structure 401 according to various embodiments disclosed in this document.

The band structure 300 according to various embodiments may enable the user to stably wear a wearable electronic device (for example, 101 in FIG. 1) and to easily detach the wearable electronic device (for example, 101 in FIG. 1) only by a simple manipulation. According to various embodiments, the band structure 300 may be contained in a housing (for example, 200 in FIG. 2). However, the band structure 300 is not necessarily limited thereto, and may be configured such that the same is connected to each of the first region 202a and the second region 202b outside the housing (for example, 200 in FIG. 2).

According to various embodiments, coordinate axes illustrated in the diagrams of this document may be for the purpose of denoting a direction in which a specific component faces. The coordinate axes as used herein may be coordinate axes in a three-dimensional space (X-axis, Y-axis, Z-axis). Referring to FIG. 3 to FIG. 4C, X-axis may refer to an axis parallel to the longitudinal direction of the first band 310 and/or the second band 320; Y-axis may refer to an axis parallel to the width direction of the connector 400; and Z-axis may refer to an axis parallel to the height direction of the connector 400. The coupling relation between respective components may be described with reference to various drawings illustrated in this document and the coordinate axes included therein. For example, FIG. 3 illustrates the rear connector housing structure 401b such that the rear surface 408 thereof is seen, and FIG. 4A illustrates the rear connector housing structure 401b such that the front surface 405 thereof is seen.

According to various embodiments, the band structure 300 may include at least one band and a connector 400. At least a part of the band may be contained in the connector 400, and may be further moved into the connector 400 or moved out of the connector 400 during an operation. According to an embodiment, the at least one band may include a first band 310 and a second band 320 as illustrated in FIG. 3. The first band 310 and the second band 320 may have the same shape and size, and may be disposed to be symmetric with each other with reference to the connector 400. For example, the first band 310 and the second band 320 may be disposed symmetrically with reference to the connector 400 as illustrated in the diagram, thereby constituting a "rail-type" band structure.

Referring to FIG. 3, the first band 310 according to various embodiments may include a first end portion 311 connected to the first region of the housing 200 (for example, first region 202a in FIG. 2). According to an embodiment, the first band 310 may include a second end portion 312 including a first rack gear 313.

According to various embodiments, the second band 320 may include a third end portion 321 connected to the second region of the housing 200 (for example, second region 202b in FIG. 2). According to an embodiment, the second band 320 may include a fourth end portion 322 including a second rack gear 323.

According to an embodiment, along the longitudinal direction of the first band 310 and the second band 320, the first end portion 311 and the third end portion 321 may be connected to the first region 202a and the second region 202b of the housing 200, respectively, and the second end portion 312 and the fourth end portion 322 may be connected to the connector 400.

According to various embodiments, the connector 400 may be configured such that the relative position between the connector 400 and the band (for example, first band 310 or second band 320), or the relative position between the first band 310 and the second band 320 is adjustable. According to an embodiment, adjustment of the relative position between the connector 400 and the band may mean that, when at least a part of the band is contained in the connector 400, the length of the contained band is adjusted. According to an embodiment, when the band structure 300 is seen from the front, the connector 400 may be disposed between the first end portion 311 of the first band 310 and the third end portion 321 of the second band 320.

According to various embodiments, the first band 310 and the second band 320 may move in a direction parallel to the X-axis illustrated in FIG. 3, and the connector 400 may move while engaging with the second end portion 312 and the fourth end portion 322, thereby adjusting the relative position of the first band 310 and the second band 320. According to an embodiment, the first rack gear 313 and the second rack gear 323 may be disposed to face each other, and may each have multiple teeth. A connector 400 having teeth corresponding to the multiple teeth formed on the first rack gear 313 and the second rack gear 323 may be disposed between the first rack gear 313 and the second rack gear 323. In a state in which a part of the connector 400 engages with the first rack gear 313, and another part of the connector 400 engages with the second rack gear 323, an interaction may occur therebetween.

The connector 400 according to various embodiments disclosed in this document may include at least a part of the connector housing structure (for example, rear connector housing structure 401b), a spur gear 410, a wheel 420, a circular plate 430, a first pawl 440, and a second pawl 450.

Referring to FIG. 3, the connector housing structure may include a front connector housing structure 401a and a rear connector housing structure 401b. The front connector housing structure 401a may be coupled to the rear connector housing structure 401b through a fastening portion 402 (for example, rivet structure, screw/bolt structure, or the like). If the front connector housing structure 401a and the rear connector housing structure 401b are coupled, the spur gear 410, at least a part of the wheel 420, the circular plate 430, the first pawl 440, the second pawl 450, and the like may be disposed in the inner space formed therein. The front connector housing structure 401a and/or the rear connector housing structure 401b may have multiple holes 403 and 404 formed therein. The multiple holes 403 and 404 may be formed through the upper and lower surfaces of the front connector housing structure 401a and/or the rear connector housing structure 401b, for example, thereby exposing at least a part of the wheel 420, as described above with reference to FIG. 2.

According to various embodiments, the front connector housing structure 401a may be a part connected to the first band 310 and the second band 320. As illustrated in FIG. 3, the first band 310 may be formed to penetrate one side of the front connector housing structure 401a such that at least a part thereof can move forwards/backwards inside the connector 400. The second band 320 may be formed to penetrate the other side of the front connector housing structure 401a such that at least a part thereof can move forwards/backwards inside the connector 400.

According to various embodiments, the rear connector housing structure 401b (hereinafter, referred to as "cover") may be formed in such a structure that the wheel 420, the circular plate 430, the first pawl 440, and the second pawl 450 can be seated thereon. According to an embodiment, the cover 401b may play the role of protecting the connector 400 from external physical impacts or infiltrating alien substances. FIG. 3 illustrates the rear surface 408 of the cover 401b, and FIG. 4B and FIG. 4C illustrate the front surface of the cover (for example, cover first surface 405 and cover (1-1)th surface 406). Referring to FIG. 4B and FIG. 4C, the first surface 405 and the (1-1)th surface 406 of the cover may be formed to have a predetermined level difference, and the wheel 420 may be seated on the (1-1)th surface 406 of the cover.

According to various embodiments disclosed in this document, the spur gear 410 may be configured to engage with the first rack gear 313 of the first band 310 and the second rack gear 323 of the second band 320, as illustrated in FIG. 4A. The spur gear 410, the first rack gear 313, and the second rack gear 323 constitutes rack-and-pinion structure such that, if the spur gear 410 rotates, the first rack gear 313 and the second rack gear 323 can move in different directions.

According to various embodiments, the wheel 420 may include a first surface 421 facing the first rack gear 313 and the second rack gear 323, and a second surface 422 facing away from the first surface 421. FIG. 3 illustrates the wheel 420 such that the second surface 422 is seen, and FIG. 4A illustrates the same such that the first surface 421 is seen.

The following description will be made, with reference to FIG. 4A to FIG. 4C, regarding the first surface 421 of the wheel and the front surface 405 of the cover.

Referring to FIG. 3 and FIG. 4A together, the wheel 420 may be configured to be coaxial with the spur gear 410. The wheel 420 may be formed to have a diameter larger than that of the spur gear 410. The wheel 420 may have dots (or grooves) 420D formed on the circumference thereof so as to provide a frictional force when the user manipulates the wheel 420.

The illustration in FIG. 4B may correspond to that in FIG. 4A, from which the first band 310, the second band 320, and the wheel 420 are omitted.

Referring to FIG. 4B, the spur gear 410 may be disposed on a surface of the circular plate 430, and the spur gear 410 and the circular plate 430 may be coaxially formed. When the circular plate 430 rotates, the spur gear 410 may rotate in the same direction as the direction of rotation of the circular plate 430. According to an embodiment, the spur gear 410 and the circular plate 430 may be formed integrally or formed as separate components. According to various embodiments, the circular plate 430 may include a first surface 431 facing the second surface 422 of the wheel 420, and a second surface 432 facing away from the first surface 431 of the circular plate 430. As described above, FIG. 3 illustrates the circular plate such that the second surface 432 thereof is seen, and FIG. 4B illustrates the circular plate 430 such that the first surface 431 thereof is seen.

According to an embodiment, the circular plate 430 may have a noncircular protrusion 4310 formed on the first surface 431 thereof. As will be described later, at least a part of the noncircular protrusion 4310 may be inserted into a noncircular recess (for example, 4226 in FIG. 3) formed in the wheel 420 such that, when the wheel rotates 420, the noncircular protrusion 4310 and the noncircular recess (for example, 4226 in FIG. 3) may contact each other and move.

According to various embodiments, grooves 433 may be formed on a side surface formed between the first surface 431 of the circular plate 430 and the second surface (for example, 432 in FIG. 3) thereof. The number of formed grooves 433 may correspond to that of pawls (for example, first pawls 440) according to various embodiments disclosed in this document. If a pawl (for example, first pawl 440) is contained in the circular plate 430, at least a part of the first pawl 440 may be exposed to the outside of the circular plate 430 through the groove 433. According to various embodiments, the circular plate 430 may rotate while seating inside a second annular portion 4222 (or ratchet ring) disposed on the (1-1)th surface 406 of the cover 401b.

The illustration in FIG. 4C may correspond to that in FIG. 4B, from which the circular plate 430 is omitted.

FIG. 4C illustrates an exemplary wearable electronic device (for example, 101 in FIG. 1) according to various embodiments, which includes a first pawl 440 and a second pawl 450. It is to be noted that, although the following description will be made with regard to two pawls 440 and 450, this is only an example. According to various embodiments, one pawl may be used, or three or more pawls may be used.

According to various embodiments, the first pawl 440 and the second pawl 450 may operate while being at least partially inserted into the circular plate (for example, 430 in FIG. 4B). As illustrated in FIG. 4C, the first pawl 440 and the second pawl 450 may be independent entities, and may be disposed symmetrically with reference to a virtual center point of the circular plate (for example, 430 in FIG. 4B).

Figure 5:
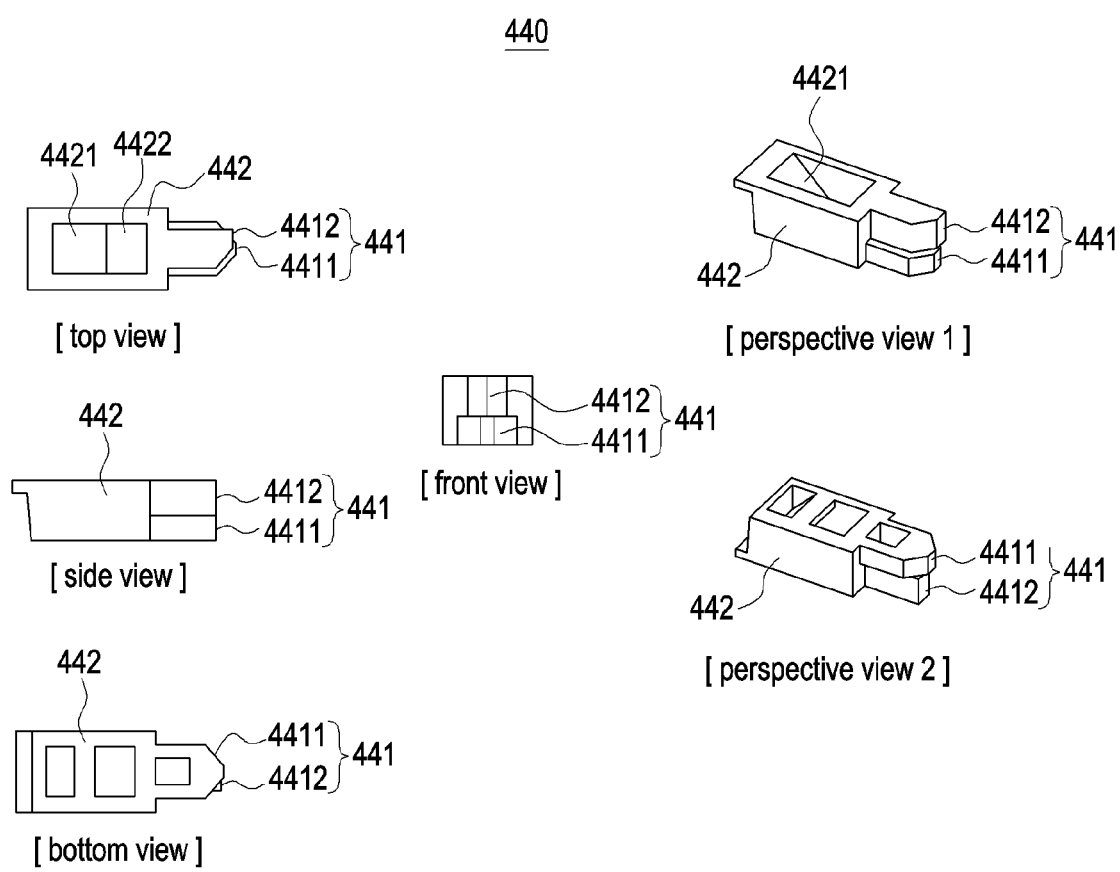
FIG. 5 is a diagram regarding a pawl according to various embodiments disclosed in this document.

FIG. 5 illustrates views regarding pawls (for example, 440 and 450). FIG. 5 may illustrate, for example, a top view of the first pawl 440, a side view thereof, a bottom view thereof, a front view thereof, a first perspective view thereof, and a second perspective view thereof.

Referring to FIG. 5, a first pawl 440 may include a first end surface 441 and a body portion 442. The first end surface 441 may be configured to extend from the body portion 442 and to engage with a component disposed near the circular plate 430. Specifically, the first end surface 441 may include a first portion 4411 having a first shape such that the same corresponds to and engages with a first recessed cam structure (for example, 4223 in FIG. 7) described later, and a second portion 4412 having a second shape such that the same corresponds to and engages with asymmetric ratchet teeth.

According to various embodiments, the first portion 4411 and the second portion 4412 may be coupled in such a manner that two blocks having different shapes are stacked. According to an embodiment, the shape or dimension (for example, width, length, or the like) of the first portion 4411 and the second portion 4412 may be variously configured. For example, as illustrated in the top view and the bottom view of FIG. 5, the first portion 4411 may be formed to have a width larger than that of the second portion 4412, and the first portion 4411 may be formed to have a maximum length larger than that of the second portion 4412. In addition, as illustrated in the side view of FIG. 5, the second portion 4412 may be formed to have a height larger than that of the first portion 4411. The embodiment described with reference to FIG. 5 is only an example. Therefore, it is to be noted that the specific shape and type of the first portion 4411 and the second portion 4412 according to the disclosure are not limited thereto.

According to an embodiment, the first portion 4411 and the second portion 4412 may be two blocks which have different shapes, and which are integrally formed. According to an embodiment, all components including the first portion 4411, the second portion 4412, and the body portion 442 illustrated in FIG. 5 may be integrally formed.

According to various embodiments, the body portion 442 of the first pawl 440 may be largely configured to have a width larger than that of the first portion 4411 and that of the second portion 4412 and to have a height corresponding to the combined heights of the first portion 4411 and the second portion 4412. According to an embodiment, a sloping surface 4421 and a sloping groove 4422 may be provided inside the body portion 442. A sloping leg (for example, 473 in FIG. 14) described later may be inserted into the sloping groove 442 so as to enable a sliding movement between the sloping surface 4421 and the sloping leg (for example, 473 in FIG. 14).

According to various embodiments, the above description may be identically applied to the second pawl 450.

According to various embodiments, the third portion 4511 of the second pawl 450 may have a third shape such that the same corresponds to and engages with a second recessed cam structure 4224, and the fourth portion 4512 thereof may have a second shape such that the same corresponds to and engages with asymmetric ratchet teeth. According to an embodiment, the third portion 4511 of the second pawl 450 may have various shapes regardless of the shape of the first portion 4411 of the first pawl 440, but the fourth portion 4512 may be formed to have the same shape and/or size as the shape of the second portion 4412 of the first pawl 440.

Figure 6A:
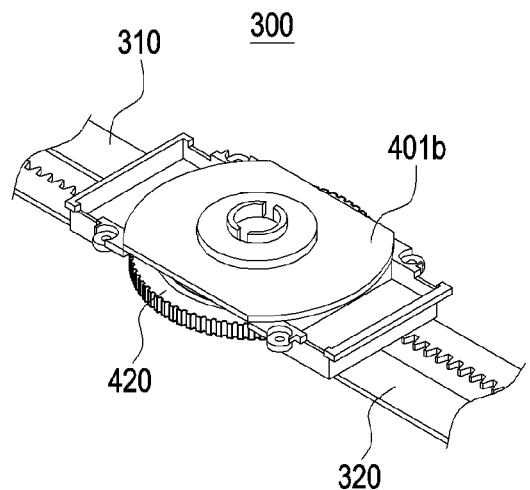
FIG. 6A is an assembled perspective view of a band structure according to various embodiments disclosed in this document.
Figure 6B:
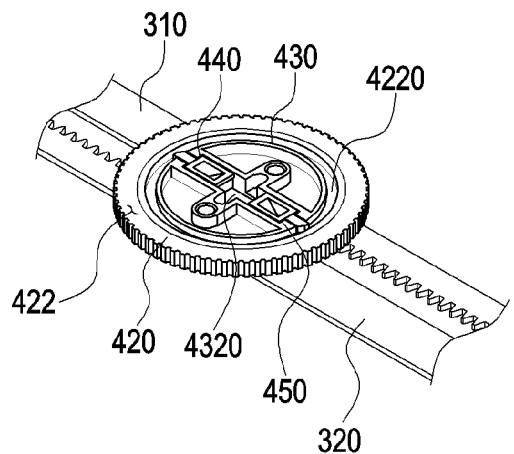
FIG. 6B is a perspective view illustrating the internal configuration of a band structure according to various embodiments disclosed in this document.

FIG. 6A is an assembled perspective view of a band structure 300 according to various embodiments disclosed in this document. FIG. 6B is a perspective view illustrating the internal configuration of a band structure 300 according to various embodiments disclosed in this document.

Illustrations in FIG. 6A and FIG. 6B may correspond to illustrations of components in FIG. 4A to FIG. 4C, seen from the opposite side.

Referring to FIG. 6A and FIG. 6B together with FIG. 3 previously referred to, the illustration in FIG. 6B may correspond to the illustration in FIG. 6A, from which the cover member 401b according to an embodiment, an elastic member (for example, 460 in FIG. 3), the link member (for example, 470 in FIG. 3), and the like are omitted.

According to various embodiments, the wheel 420 may have a circular recess 4220 formed on the second surface 422 thereof. The circular recess 4220 may correspond to a part of the center portion of the wheel 420, which is widely lead in in the inward direction. At least a part of the circular plate 430 may be inserted into and disposed in the circular recess 4220. According to an embodiment, the circular recess 4220 may be formed to have a larger area than the first surface (for example, 431 in FIG. 4) of the circular plate 430. FIG. 6B illustrates the circular plate 430 such that the second surface (for example, 432 in FIG. 3) thereof is seen. According to various embodiments, the circular plate 430 may have a recess guide channel 4320 formed on the second surface (for example, 432 in FIG. 3) thereof so as to extend from the center of the circular plate 430 in the diameter direction. As illustrated in FIG. 6B, the recess guide channel 4320 may have a concave space into which a first pawl 440 and a second pawl 450 are inserted. In addition, the recess guide channel 4320 may play the role of guiding straightforward movements of the first pawl 440 and the second pawl 450 while the first pawl 440 and the second pawl 450 are contained in the space. The first pawl 440 and the second pawl 450 may move in the diameter direction of the circular plate 430 inside the recess guide channel 4320.

According to an embodiment, the recess guide channel 4320 may be configured to be integrally formed on the circular plate 430. Therefore, if the circular plate 430 rotates, the first pawl 440 and the second pawl 450, which are disposed in the recess guide channel 4320, may rotate in the same direction as the direction in which the circular plate 430 rotates.

According to various embodiments, the second annular portion 4222 (or ratchet ring) illustrated in FIG. 4B and FIG. 4C may be inserted into the circular recess 4220 of the wheel 420. If a state in which the second annular portion 4222 (or ratchet ring) is inserted (FIG. 6B) is reached, operations and the like for tightening/loosening the band adjustment device by using the ratchet may become possible. Various embodiments regarding tightening/loosening and the like will be described later with reference to FIG. 10.

Figure 7A:
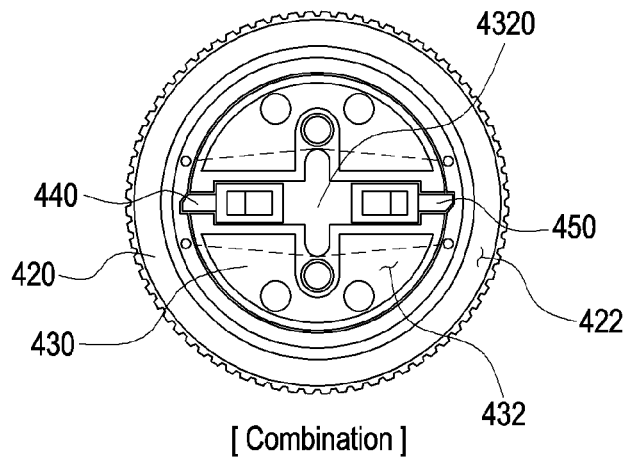
FIG. 7A is a diagram illustrating a wheel and a circular plate, which are coupled to each other, according to various embodiments disclosed in this document.
Figure 7B:
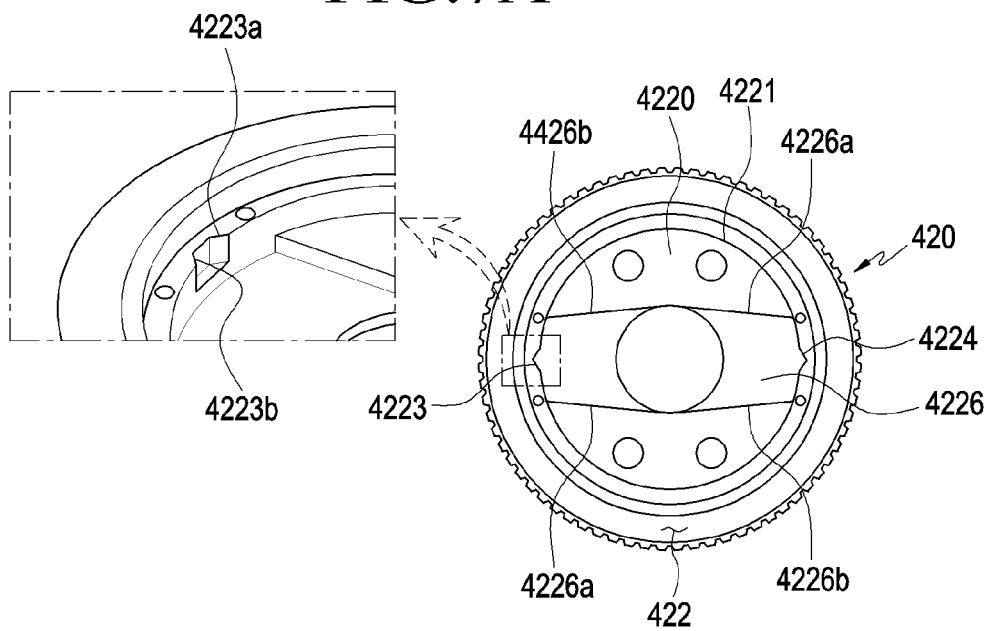
FIG. 7B is a bottom view of a wheel according to various embodiments disclosed in this document.
Figure 7C:
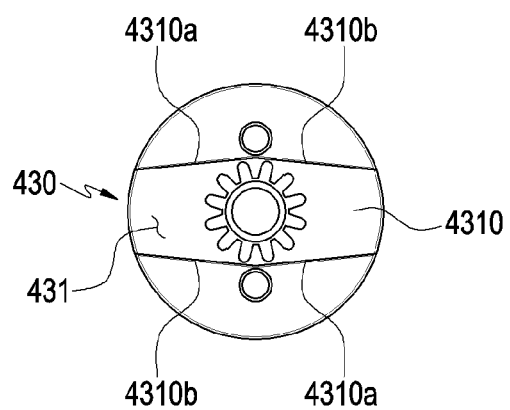
FIG. 7C is a top view of a circular plate according to various embodiments disclosed in this document.
Figure 8A:
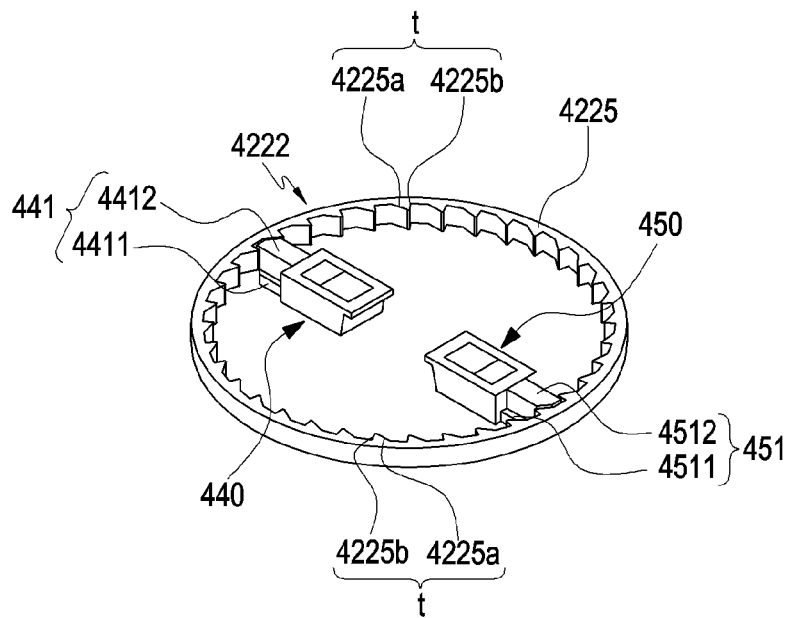
FIG. 8A is a diagram illustrating a second annular portion, to which a pawl is coupled, according to various embodiments disclosed in this document.
Figure 8B:
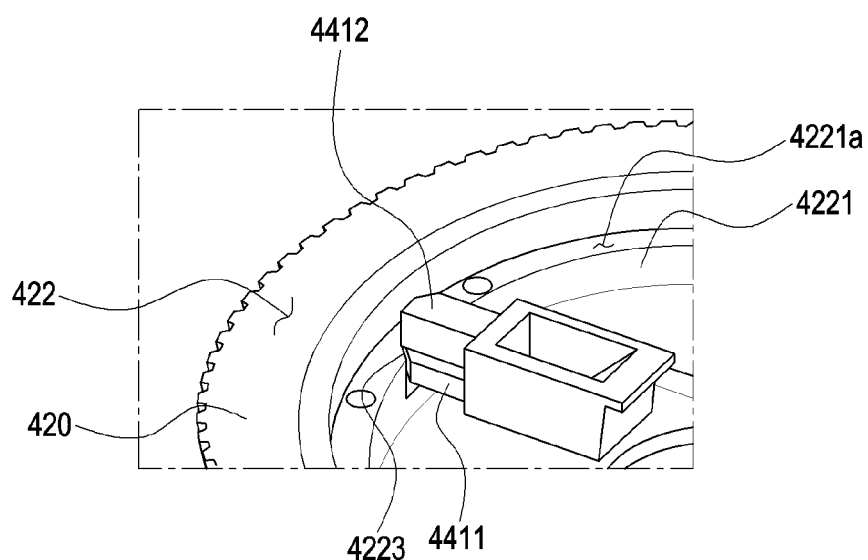
FIG. 8B is a diagram illustrating a first annular portion, to which a pawl is coupled, according to various embodiments disclosed in this document.
Figure 9A:
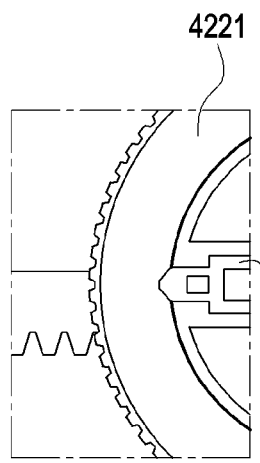
FIG. 9A is a diagram illustrating a first pawl, at least a part of which is inserted into a first recessed cam structure.
Figure 9B:
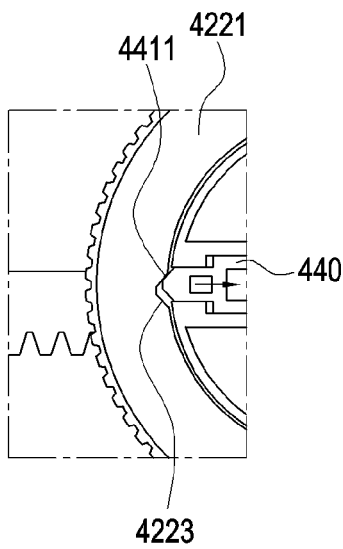
FIG. 9B is a diagram illustrating a first pawl, at least a part (for example, first portion) of which slips on an edge of a first recessed cam structure.
Figure 9C:
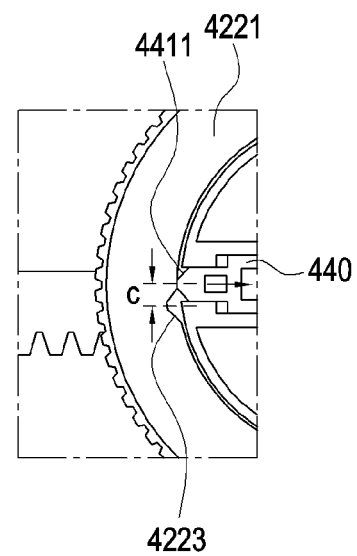
FIG. 9C is a diagram illustrating a first pawl, at least a part (for example, first portion) of which has moved away from the first recessed cam structure.

FIG. 7A is a bottom view illustrating a wheel 420 and a circular plate 430, which are coupled to each other, according to various embodiments disclosed in this document. FIG. 7B is a bottom view of the wheel 420 according to various embodiments disclosed in this document. FIG. 7C is a top view of the circular plate 430 according to various embodiments disclosed in this document. FIG. 8A is a diagram illustrating a second annular portion 4222, to which pawls 440 and 450 are coupled, according to various embodiments disclosed in this document. FIG. 8B is a diagram illustrating a first annular portion 4221, to which a pawl (for example, 440 in FIG. 8A) is coupled, according to various embodiments disclosed in this document. FIG. 9A to FIG. 9C are diagrams schematically illustrating the position relation between a first pawl 440 and a first annular portion 4221, before the first pawl 440 moves, according to various embodiments disclosed in this document. FIG. 9A is a diagram illustrating a first pawl 440, at least a part of which is inserted into a first recessed cam structure 4223. FIG. 9B is a diagram illustrating a first pawl 440, at least a part (for example, first portion 4411) of which slips on an edge (for example, symmetric edge) of a first recessed cam structure 4223. FIG. 9C is a diagram illustrating a first pawl 440, at least a part (for example, first portion 4411) of which has moved away from the first recessed cam structure 4223.

Referring to FIG. 7A, a combination of a wheel 420, a circular plate 430, a first pawl 440, and a second pawl 450 is illustrated. The combination of the wheel 420 and the circular plate 430 in FIG. 7A may be individually illustrated in FIG. 7B and FIG. 7C. FIG. 7B and FIG. 8B may together illustrate an embodiment of a first annular portion 4221. FIG. 8A may illustrate an embodiment of a second annular portion 4222.

Referring to FIG. 7B, the wheel 420 according to various embodiments disclosed in this document may include a circular recess 4220 including a first annular portion 4221. The circular recess 4220 may be configured as a substantially flat surface. The circular recess 4220 may be formed to lead in from the second surface 422 of the wheel 420, and may have an inner wall formed on the periphery thereof. The inner wall may be the first annular portion 4221. The first annular portion 4221, together with a second annular portion (described later), may be configured to abut one end of the first pawl 440 and that of the second pawl 450.

According to various embodiments, the first annular portion 4221 may include, as illustrated in FIG. 7B, a first recessed cam structure 4223 and a second recessed cam structure 4224 placed in opposite directions. The first recessed cam structure 4223 may have symmetric edges 4223a and 4223b formed thereon, and the second recessed cam structure 4224 may similarly have symmetric edges formed thereon. According to an embodiment, the first annular portion 4221 may be formed integrally with the wheel 420, on the periphery of the circular recess 4220.

According to various embodiments, the wheel 420 may have a noncircular recess 4226 formed thereon, and the circular plate 430 may have a noncircular protrusion 4310 formed thereon. Referring to FIG. 7A to FIG. 7C together, the noncircular recess 4226 may be formed on the second surface 422 of the wheel 420, and the noncircular protrusion 4310 may be formed on the first surface 431 of the circular plate 430. Therefore, when the wheel 420 and the circular plate 430 are assembled to face each other, the noncircular protrusion 4310 may be at least partially inserted into the noncircular recess 4226. According to an embodiment, the noncircular protrusion 4310 may be assumed so as not to be fitted to the noncircular recess 4226. For example, the noncircular recess 4226 may be formed to have a larger area than the noncircular protrusion 4310. According to an embodiment, when the noncircular protrusion 4310 is at least partially inserted into the noncircular recess 4226, a gap (for example, g in FIG. 11) may be provided. Existence of the gap may prevent the noncircular protrusion 4310, when at least partially inserted into the noncircular recess 4226, from being fully fitted thereto. In some embodiments, when the wheel 420 rotates, the noncircular protrusion 4310 may contact and support the noncircular recess 4226, thereby transferring rotational power from the wheel 420 to the circular plate 430. To this end, according to various embodiments disclosed in this document, the noncircular recess 4226 may have a first edge 4226a, and the noncircular protrusion 4310 may have a first edge 4310a in response thereto. According to an embodiment, the noncircular recess 4226 may have not only a first edge 4226a, but also a second edge 4226b, and the noncircular protrusion 4310 may have a second edge 4310b in response thereto. According to an embodiment, if the first edge 4310a of the noncircular protrusion 4310 and the first edge 4226a of the noncircular recess 4226 contact each other, a gap (for example, g in FIG. 11) may be formed between the second edge 4310b of the noncircular protrusion 4310 and the second edge 4226b of the noncircular recess 4226. Inversely, if the second edge 4310b of the noncircular protrusion 4310 and the second edge 4226b of the noncircular recess 4226 contact each other, a gap (for example, g in FIG. 11) may be formed between the first edge 4310a of the noncircular protrusion 4310 and the first edge 4226a of the noncircular recess 4226. Interaction between the first edge 4226a and the second edge 4226b of the noncircular recess 4226 and the first edge 4310a and the second edge 4310b of the noncircular protrusion 4310 according to various embodiments will be described later with reference to FIG. 10 to FIG. 12.

Referring to FIG. 8A, the second annular portion 4222 according to various embodiments may form an inner ratchet ring 4225 including asymmetric ratchet teeth t having a first edge 4225a having a first slope and a second edge 4225b having a second slope having a larger inclination than the first slope. According to an embodiment, the first edge 4225a may have a gentle inclination, and the second edge 4225b may have a relative steep inclination.

Referring to FIG. 8A and FIG. 8B, the second annular portion 4222 may be configured separately from the first annular portion 4221. According to various embodiments, the second annular portion 4222 may have a ring form (hereinafter, also referred to as "ratchet structure" or "ratchet ring 4225"). According to an embodiment, the second annular portion 4222 may be included in a rear connector housing structure (for example, 401b in FIG. 3), and may be formed integrally with the rear connector housing structure (for example, 401b in FIG. 3). When the circular plate 430 is disposed on the wheel 420, the second annular portion 4222 may be inserted into the space (for example, circular recess 4220 part in FIG. 6B) between the wheel 420 and the circular plate 430.

According to various embodiments, in the process of assembling the connector 400, the second annular portion 4222 may be stacked on the upper surface 4221a of the first annular portion 4221. According to an embodiment, the second annular portion 4222 may be stacked on the upper surface 4221a of the first annular portion 4221 in a state in which the circular plate 430 is disposed on the circular recess 4220 having the first annular portion 4221, and in which the first pawl 440 and the second pawl 450 are disposed in the recess guide channel 4320 of the circular plate 430.

Referring to FIG. 7A to FIG. 9C together, the first portion 4411 of the first pawl 440, in connection with the assembled connector 400, may be disposed to engage with the first recessed cam structure 4223 formed on the first annular portion 4221. In addition, the second portion 4412 of the first pawl 440 may be disposed to engage with the asymmetric ratchet teeth t formed on the second annular portion 4222. Likewise, the third portion 4511 of the second pawl 450 may be disposed to engage with the second recessed cam structure 4224 formed on the first annular portion 4221. In addition, the fourth portion 4512 of the second pawl 450 may be disposed to engage with the asymmetric ratchet teeth t formed on the second annular portion 4222.

According to various embodiments, the first portion 4411 may have a shape (for example, symmetric edge) configured such that the same corresponds to and engages with the first recessed cam structure 4223, while the second portion 4412 may have a shape (for example, asymmetric edge) configured such that the same corresponds to and engages with the asymmetric ratchet teeth t. According to various embodiments, the first portion 4411 may move smoothly in any direction while engaging with the first recessed cam structure 4223. If the first portion 4411 receives rotational power while engaging with the first recessed cam structure 4223, the same may slip by a predetermined amount along the symmetric edge of the first recessed cam structure 4223, as illustrated in FIG. 9B. In this case, the first pawl 440 may move backwards slightly towards the center of the recess guide channel 4320 inside the recess guide channel 4320.

According to various embodiments, the movement of the second portion 4412 may be limited according to the direction of rotation of the wheel 420. For example, when the second portion 4412 having an asymmetric edge moves towards the first edge 4225a having a relative gentle inclination among the asymmetric ratchet teeth, the second portion 4412 may move to an adjacent tooth of the asymmetric ratchet teeth t. According to another embodiment, when the second portion 4412 moves towards the second edge 4225b having a steep inclination, the same may be blocked by the second edge 4225b, which may then limit the movement thereof. According to various embodiments, the same description of the first pawl 440 may be applied to the second pawl 450. According to various embodiments, the first portion 4411 and the third portion 4511 may correspond to and engage with the recess cam structures 4223 and 4224 having symmetric edges, and the second portion 4412 and the fourth portion 4512 may correspond to and engage with the asymmetric ratchet teeth t.

According to an embodiment, the second portion 4412 may be stacked on the first portion 4411, and the fourth portion 4512 may be stacked on the third portion 4511. In this case, the overall movement of the first pawl 440 and the second pawl 450 may be limited by the operation of the second portion 4412 and the fourth portion 4512 engaging with ratchet teeth having asymmetric edges, respectively.

According to various embodiments, as illustrated in FIG. 9C, the first portion 4411 may be designated so as not to exceed a designated spacing distance C. The designated spacing distance C may be a distance by which the first pawl 440 can return during a rotation. For example, if the first portion 4411 slips to such an extent that the designated spacing distance C is exceeded, the first pawl 440 may not return to the original position. Loosening operations will be described later with reference to FIG. 12.

According to various embodiments, in a state in which one or more pawls (for example, first pawl 440 and second pawl 450) correspond to and engage with a ratchet structure having asymmetric ratchet teeth t, operations of the pawls with regard to movements of the wheel 420 may be described. According to an embodiment, when the wheel 420 rotates in a specific direction (for example, first direction), the first pawl 440 and the second pawl 450 may have relative movements (for example, rotations or forward/backward movements) with regard to the wheel 420. In the case of a rotation in the opposite direction (for example, second direction) to the specific direction, the first pawl 440 and the second pawl 450 may reach a state in which they engage with the ratchet structure, and relative movements (for example, rotations or forward/backward movements) thereof with regard to the wheel 420 may accordingly be limited. According to some embodiments, relative movements of the first pawl 440 and the second pawl 450 may occur under various conditions according to the shape and dimension of the first annular portion 4221 and the second annular portion 4222.

According to an embodiment, the first recessed cam structure 4223 may be formed at a specific point on the first annular portion 4221, and the second recessed cam structure 4224 may be formed on the first annular portion 4221 opposite the point at which the first recessed cam structure 4223 is formed. Contrary to the fact that the asymmetric ratchet teeth t may be formed across the entire circumference of the second annular portion 4222, only one first recessed cam structure 4223 and only one second recessed cam structure 4224 may be provided and positioned opposite each other.

Hereinafter, other various embodiments of the wearable electronic device (for example, 101 in FIG. 1) disclosed in this document may be described.

Referring back to FIG. 3, the wheel 420 may include an opening 423 at the center of the circular recess 4220, and the spur gear (for example, 410 in FIG. 4B) may be disposed in the opening 423. According to an embodiment, the spur gear (for example, 410 in FIG. 4B) may be connected to the first band 310 and the second band 320, which face the first surface (for example, 421 in FIG. 4A) of the wheel 420 through the opening 423. The connector 400 according to various embodiments disclosed in this document may additionally include an elastic member 460 and a link member 470.

Referring to FIG. 3 again, the elastic member 460 may be disposed between the first pawl 440 and the second pawl 450. The elastic member 460 may be inserted into the recess guide channel 4320 together with the first pawl 440 and the second pawl 450. According to an embodiment, the elastic member 460 may contact the other end portion of the first pawl 440, which is positioned on the opposite side of the first end surface (for example, 441 in FIG. 5), and may contact the other end portion of the second pawl 450, which is positioned on the opposite side of the second end surface (for example, 451). The elastic member 460 may be configured such that, even if the first pawl 440 and the second pawl 450 make backward movements with regard to the first recessed cam structure 4223 and the second recessed cam structure 4224, respectively, they are provided with restoring power and thus return to the first recessed cam structure 4223 and the second recessed cam structure 4224.

According to various embodiments, the link member 470 may include a first surface facing the first pawl 440 and the second pawl 450, and a second surface 472 facing away from the first surface. FIG. 3 illustrates, as an embodiment, the second surface 472 disposed to face the cover 401b. The link member 470 may play the role of transferring an external pressure, through a button unit 420, to the connector 400. The link member 470 has a sloping leg (for example, 473 in FIG. 13) formed on the first surface thereof, and the sloping leg 473 may be configured to slide along the sloping surface 4421 while being inserted into the sloping groove 4422 formed on the first pawl 440 and the second pawl 450. Operations of the link member 470 according to an embodiment will be described later.

Figure 10:
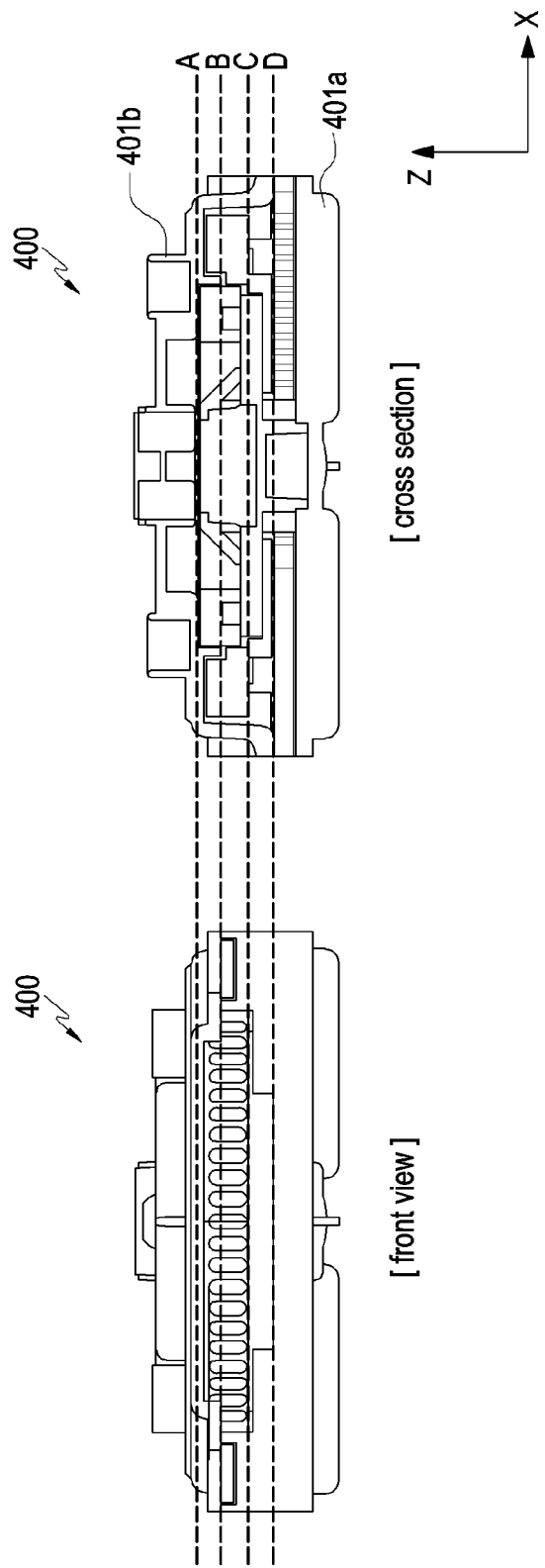
FIG. 10 is a diagram illustrating a front view of a connector and a cross-section view thereof, according to various embodiments disclosed in this document.
Figure 11:
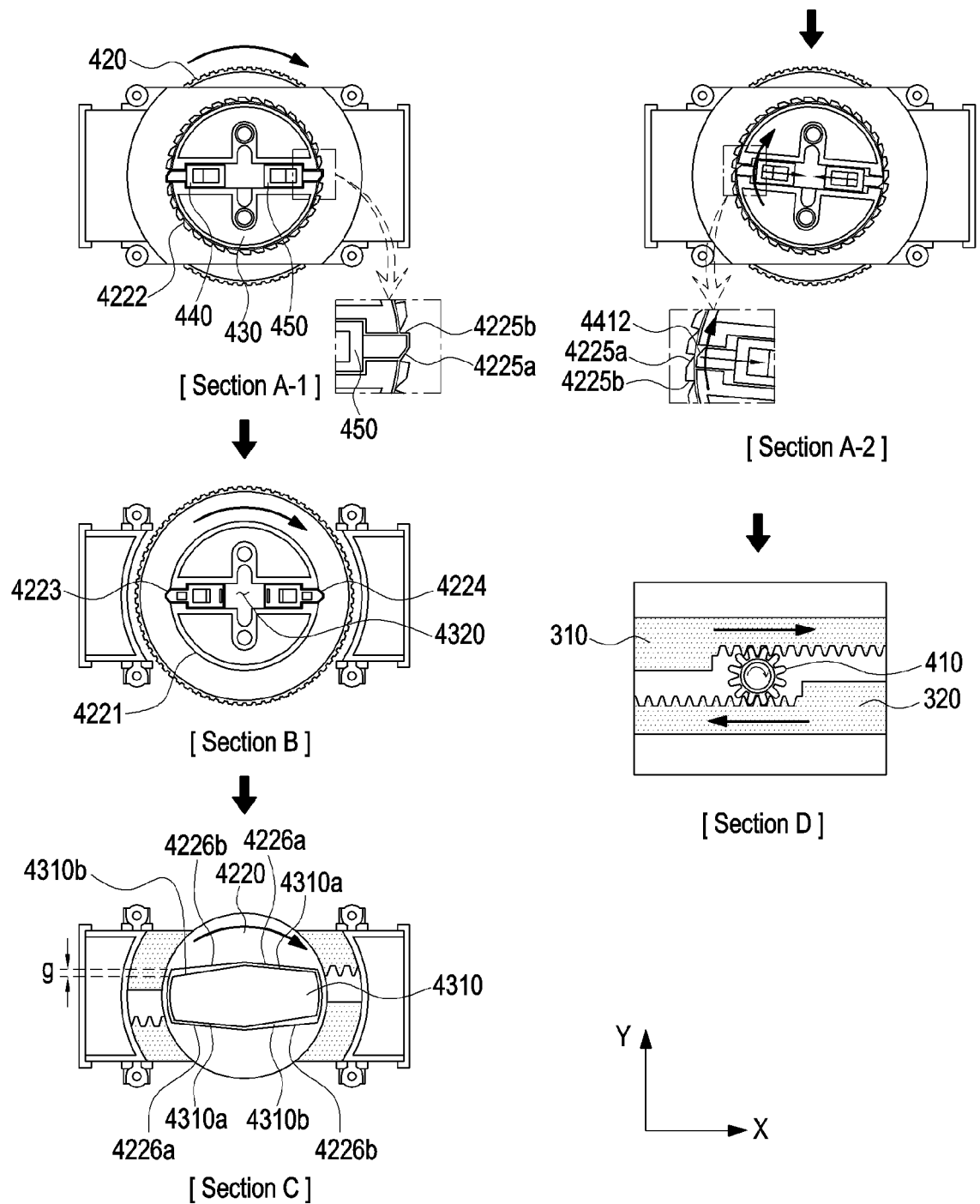
FIG. 11 and FIG. 12 are diagrams for schematically describing operations of respective components included in a connector according to various embodiments disclosed in this document.
Figure 12:
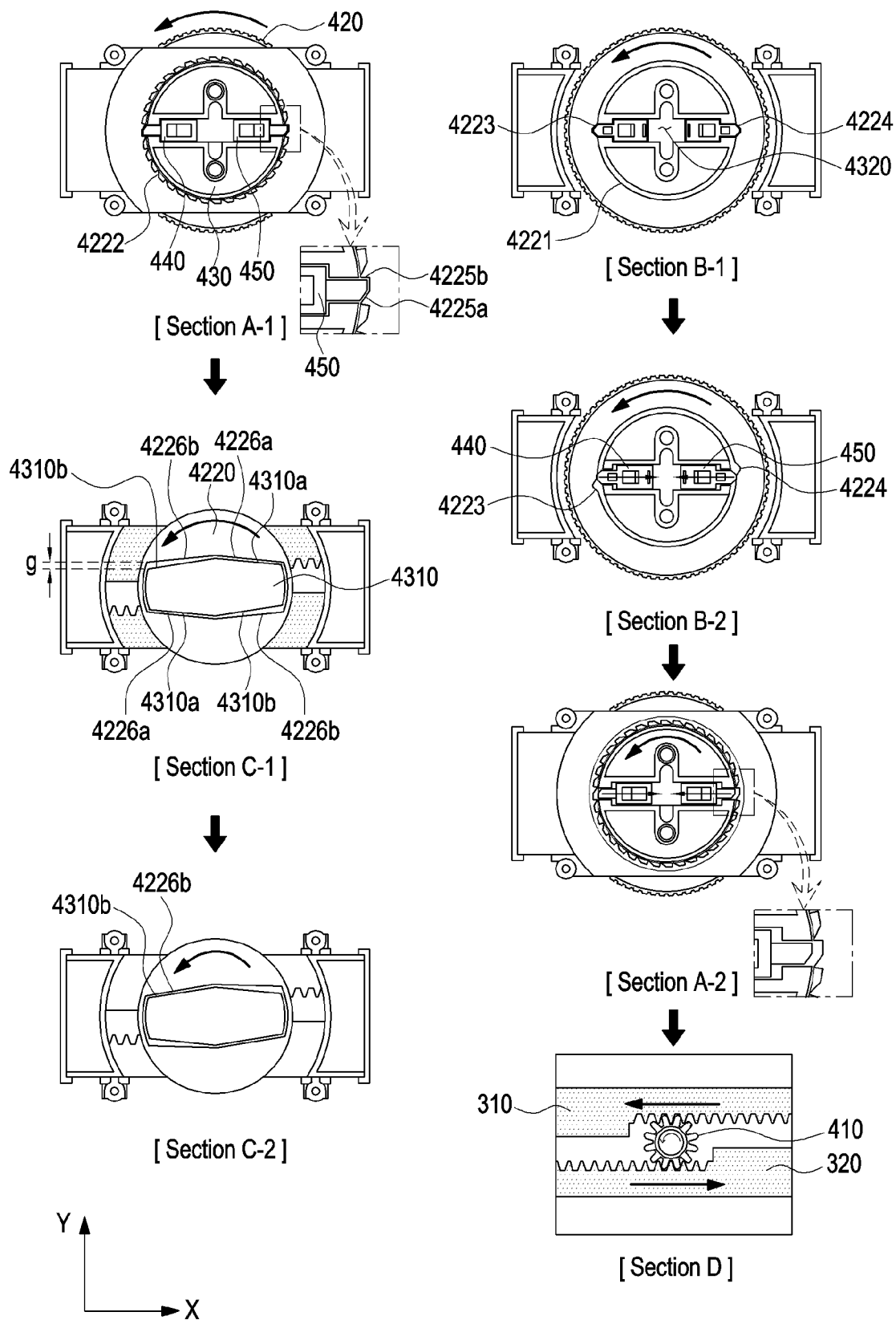

FIG. 10 is a diagram illustrating a front view of a connector 400 and a cross-section view thereof, according to various embodiments disclosed in this document. FIG. 11 and FIG. 12 are diagrams for schematically describing operations of respective components included in a connector 400 according to various embodiments disclosed in this document.

FIG. 10 may illustrate a connector 400, in an assembled state, according to various embodiments disclosed in this document. The front view in FIG. 10 illustrates, as an assembly structure including a connector 400, a state in which a front connector housing 401a and a cover 401b are coupled to each other, and a wheel 420 is exposed to the outside. The cross-section view in FIG. 10 illustrates, as an assembled connector 400, a first band 310, a second band 320, a spur gear 410, a wheel 420, a circular plate 430, a first pawl 440, a second pawl 450, a noncircular protrusion 4310, and the like.

The diagrams in FIG. 11 and FIG. 12 may correspond to sections (Section A, Section B, Section C, and Section D) of the assembly structure including the connector 400 illustrated in FIG. 10, taken along line A, line B, line C, and line D illustrated in FIG. 10. It is to be noted that, although it is assumed in the embodiment illustrated in FIG. 11 and FIG. 12, for convenience of description, that a first pawl 440 and a second pawl 450 are provided, the scope of the disclosure is not limited thereto, and may also include an embodiment in which a single pawl (first pawl 440 or second pawl 450) or three or more pawls are provided, unlike the example illustrated in the drawings.

Operations of a wearable electronic device (for example, 101 in FIG. 1) according to various embodiments disclosed in this document may include a locking operation, a tightening operation, a loosening operation, and a rapid loosening operation (or fully loosening operation).

According to various embodiments, the locking operation may refer to an operation of preventing the band structure (for example, band structure 300 in FIG. 3) from easily untightening in a situation in which the housing (for example, 200 in FIG. 2) is instantly pulsed by an external force.

In connection with the locking operation, an external force may act on the housing (for example, 200 in FIG. 2), thereby forcing the first band 310 and the second band 320 to move away from each other. In such a case, according to various embodiments disclosed in this document, an end portion of the pawl (for example, at least one of first pawl 440 or second pawl 450) engages with the asymmetric ratchet teeth t, and the band structure (for example, band structure 300 in FIG. 3) may therefore not easily untighten. For example, if an external force acts in such a direction that the first end portion 311 and the third end portion 321 of the band structure (for example, band structure 300 in FIG. 3) move away from each other, and if the spur gear (for example, 410 in FIG. 4) accordingly tends to rotate, rotation of the spur gear (for example, 410 in FIG. 4) may be limited because a pawl (for example, at least one of first pawl 440 or second pawl 450) engages with the second edge 4225b having a steep inclination among the asymmetric ratchet teeth t.

According to various embodiments, the tightening operation may be an operation when a means (for example, band structure 300 in FIG. 3) for adjusting the dimension (or length) of the housing (for example, 200 in FIG. 2) is used to reduce the dimension. Referring to FIG. 11, an operation for tightening the connector 400 according to various embodiments disclosed in this document may be illustrated.

In connection with the tightening operation, according to various embodiments, if the wheel 420 rotates clockwise, the end portion of the first pawl 440 and that of the second pawl 450 may contact the first edge 4225a, as in the case of the example illustrated at Section A-1. Then, referring to Section B, the first pawl 440 and the second pawl 450 may correspond to and engage with the first recessed cam structure 4223 and the recess cam structure 4224. Referring to Section C, during the tightening operation, the noncircular recess 4226 and the noncircular protrusion 4310 may abut each other. In this case, a part (for example, first edge 4226a) of the noncircular recess 4226 and a part (for example, first edge 4310a) of the noncircular protrusion 4310 may contact and be supported such that rotational power is directly transferred from the wheel 420 toward the noncircular protrusion 4310. Referring to Section A-2 again, the first pawl 440 and the second pawl 450 which have been corresponding to and engaging with the first recessed cam structure 4223 and the recess cam structure 4224, respectively, may be pushed backwards while slipping along the first edge 4225a of the ratchet structure. Therefore, the first pawl 440 and the second pawl 450 may partially move backwards toward the center of the recess guide channel (for example, 4320). The rotational power transferred by the noncircular protrusion 4310 may be transferred to the first band 310 and the second band 320 through the spur gear 410, referring to Section D, thereby implementing the tightening operation.

According to an embodiment, the tightening operation may be performed each time the first pawl 440 and the second pawl 450 move from one of multiple ratchet teeth t to another tooth adjacent thereto. Movements of the first pawl 440 and the second pawl 450 to another adjacent tooth are completed after the end portion of the first pawl 440 and that of the second pawl 450 slip along the first edge 4225a, the end portion of the first pawl 440 and that of the second pawl 450 may undergo a process of returning to original positions. Therefore, the tightening operation may proceed discretely.

The loosening operation according to various embodiments may be an operation when a means (for example, band structure 300 in FIG. 3) for adjusting the dimension (or length) of the housing (for example, 200 in FIG. 2) is used to increase the dimension.

Referring to FIG. 12, an operation for loosening the connector 400 according to various embodiments disclosed in this document may be illustrated.

In connection with the loosening operation, according to various embodiments, if the wheel 420 rotates counterclockwise, the first pawl 440 and the second pawl 450 may contact the second edge 4225b having a steep inclination, as in the case of the example illustrated at Section A-1. Referring to Section C-1, during the loosening operation, the noncircular recess 4226 and the noncircular protrusion 4310 may not abut each other. In this case, referring to Section B-1, the first pawl 440 and the second pawl 450 may correspond to and engage with the first recessed cam structure 4223 and the recess cam structure 4224, respectively. During the loosening operation, in the case of the example illustrated at Section C-2, the wheel 420 may rotate first as much as the gap g between the noncircular recess 4226 and the noncircular protrusion 4310. If the wheel 420 rotates as much as the gap g, the second edge 4226b of the noncircular recess 4226 and the second edge 4310b of the noncircular protrusion may abut each other. Then, the end portion of the first pawl 440 and that of the second pawl 450 which have been inserted into the first recessed cam structure 4223 and the second recessed cam structure 4224, respectively, may slip along the edge of the first recessed cam structure 4223 and that of the second recessed cam structure 4224, as in the case of the example illustrated at Section B-2, and the first pawl 440 and the second pawl 450 may accordingly be partially pushed backwards toward the center of the recess guide channel 4320. Referring to Section A-2, the first pawl 440 and the second pawl 450 may maintain the state in which they have moved backwards toward the center of the recess guide channel 4320, while the second edge 4226b of the noncircular recess 4226 and the second edge 4310b of the noncircular protrusion abut each other. Rotational power transferred by the noncircular protrusion 4310 may be transferred to the first band 310 and the second band 320 through the spur gear 410, referring to Section D, thereby implementing the loosening operation.

According to an embodiment, during the loosening operation, as in the case of the example illustrated at Section A-2, the first pawl 440 and the second pawl 450 may rotate while maintaining the state in which they have moved backwards toward the recess guide channel 4320, and the loosening operation may accordingly proceed continuously.

According to various embodiments, during the loosening operation, as in the case of the example illustrated at Section A-2, if the first pawl 440 and the second pawl 450 rotate while maintaining the state in which they have moved backwards toward the recess guide channel 4320 and then reach final target positions, the first pawl 440 and the second pawl 450, which have been sliding along the edge of the first recessed cam structure 4223 and that of the second recessed cam structure 4224, may be restored such that they correspond to and engage with the first recessed cam structure 4223 and the recess cam structure 4224, as in the case of the example illustrated at Section B-1. In this case, a gap g may be again formed between the noncircular recess 4226 and the noncircular protrusion 4310, as in the case of the example illustrated at Section C-1. According to various embodiments, an elastic member (for example, 460 in FIG. 3) may be provided in the recess guide channel 4320 between the first pawl 440 and the second pawl 450, thereby providing a force such that the first pawl 440 and the second pawl 450 return to original positions.

Referring to FIG. 9 and FIG. 12, the distance by which the first pawl 440 and the second pawl 450 slip along the symmetric edges 4223*a*, 4223*b*, 4224*a*, and 4224*b* of the first recessed cam structure 4223 and the second recessed cam structure 4224 during the loosening operation (hereinafter, referred to as "amount of slip") may be designated. For example, the distance between the center of the symmetric edges 4223*a* and 4223*b* of the first recessed cam structure 4223 and the boundary of the points at which the symmetric edges 4223*a* and 4223*b* end may be designated as the amount of slip, and the first pawl 440 may be configured to slip only within the range of the designated amount of slip. According to various embodiments, the first pawl 440 and the second pawl 450 may not be restored, if the designated amount of slip is exceeded. Therefore, the connector (for example, 400 in FIG. 3) may be designed such that the first pawl 440 and the second pawl 450 do not slip beyond the designated amount of slip. According to various embodiments, the designated amount of slip may be configured, for example, in view of the gap g between the first pawl 440, the second pawl 450, the first recessed cam structure 4223, the second recessed cam structure 4224, or the noncircular recess 4226 and the noncircular protrusion 4310.

According to various embodiments, the rapid loosening operation may be described with reference to FIG. 13. The rapid loosening operation may be able to reducing the dimension (or length) of the housing (for example, 200 in FIG. 2) more rapidly than the loosening operation according to an embodiment, through a third operation (for example, button pressing operation) while rotating the wheel 420, for example.

Figure 13:
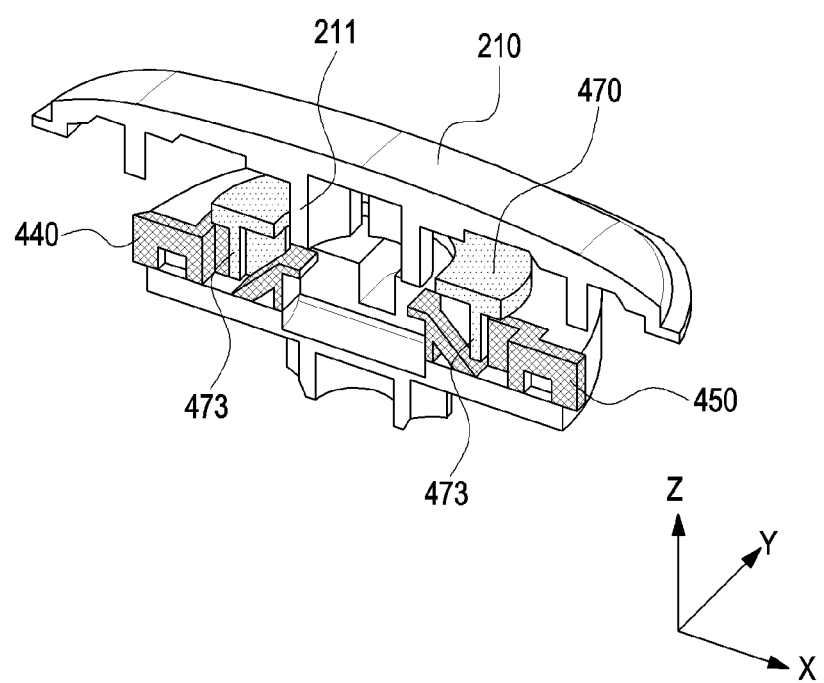
FIG. 13 is a perspective view illustrating a button unit, a link, a first pawl, and a second pawl according to various embodiments disclosed in this document.
Figure 14:
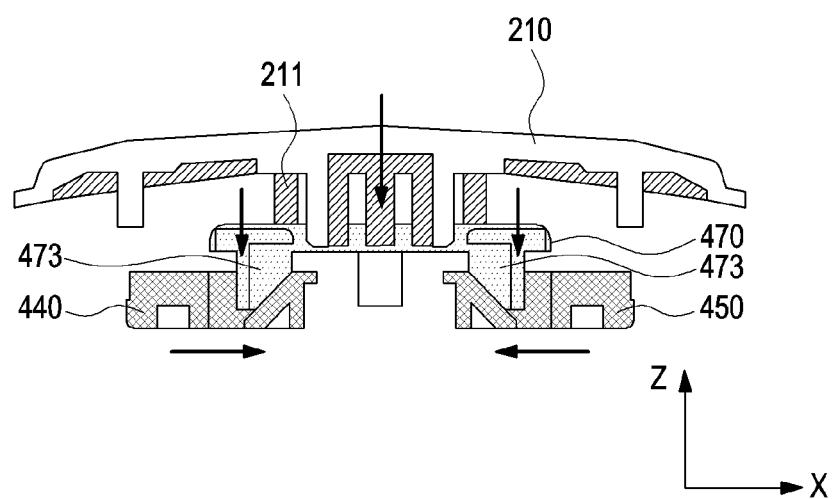
FIG. 14 is a front view illustrating a button unit, a link, a first pawl, and a second pawl according to various embodiments disclosed in this document.

FIG. 13 is a perspective view illustrating a button unit 210, a link member 470, a first pawl 440, and a second pawl 450 according to various embodiments disclosed in this document. FIG. 14 is a front view illustrating a button unit 210, a link member 470, a first pawl 440, and a second pawl 450 according to various embodiments disclosed in this document.

Referring to FIG. 13 and FIG. 14, the button unit 210 may have a button leg 211 connected to the link member 470 provided inside a connector (for example, 400 in FIG. 3), and the link member 470 may be connected to the first pawl 440 and the second pawl 450.

According to various embodiments, if the user presses the button unit 210, the link member 470 is pressed by the button unit 210 pressing action, and the first pawl 440 and the second pawl 450 may be moved backwards toward the center of a recess guide channel (for example, 4320 in FIG. 11/FIG. 12) by a sloping leg 473 formed on the link member 470. As a result, the first pawl 440 and the second pawl 450 may not engage with a ratchet structure and a cam structure formed on the inner peripheral surface of the wheel 420 (for example, an unlocking state may be reached).

For example, in the unlocking state, the first pawl 440 and the second pawl 450 do not engage with the ratchet structure, and the loosening operation may proceed more rapidly.

A method for operating a wearable electronic device according to various embodiments disclosed in this document may be described with reference to FIG. 15 to FIG. 17.

Figure 15:
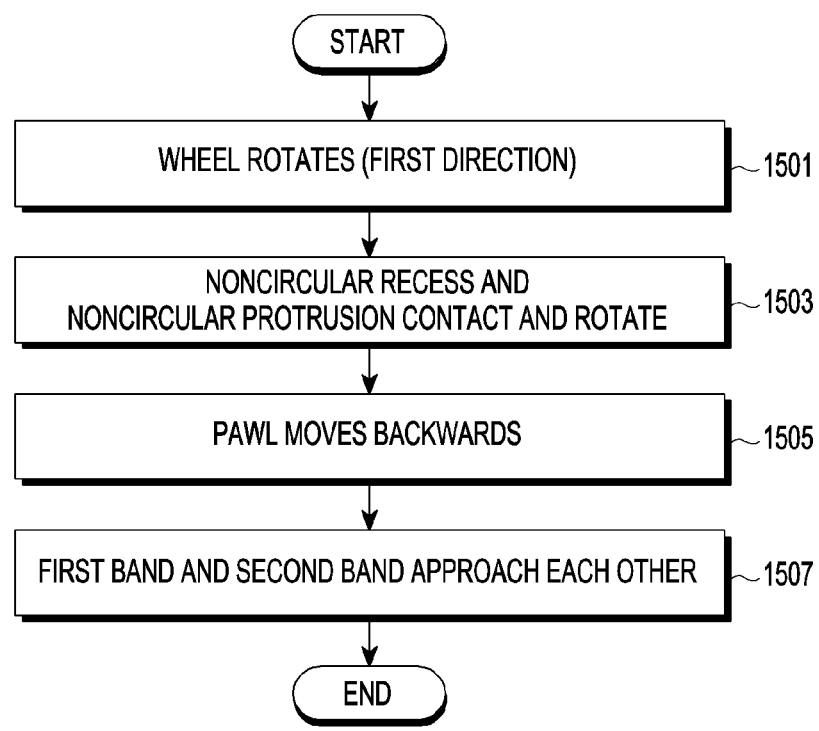
FIG. 15 is a flowchart illustrating a tightening operation according to various embodiments disclosed in this document.

FIG. 15 is a flowchart illustrating a tightening operation according to various embodiments disclosed in this document. FIG. 16 is a flowchart illustrating a loosening operation (for example, first loosening operation) according to various embodiments disclosed in this document. FIG. 17 is a flowchart illustrating a rapid loosening operation (for example, second loosening operation) according to various embodiments disclosed in this document.

A method for operating a wearable electronic device according to various embodiments disclosed in this document may be directed to a wearable electronic device (for example, 101 in FIG. 1) including: a housing (for example, 200 in FIG. 3) containing electronic components; a band structure (for example, 300 in FIG. 3) including a first band (for example, 310 in FIG. 3) and a second band (for example, 320 in FIG. 3); and a connector (for example, 400 in FIG. 3) capable of adjusting the relative position between the first band (for example, 310 in FIG. 3) and the second band (for example, 320 in FIG. 3). The connector (for example, 400 in FIG. 3) includes: a spur gear (for example, 410 in FIG. 3) engaging with the first band (for example, 310 in FIG. 3) and the second band (for example, 320 in FIG. 3); a wheel (for example, 420 in FIG. 11) at least partially exposed to the outside of the connector (for example, 400 in FIG. 3); a circular plate (for example, 430 in FIG. 3) at least partially inserted into a circular recess (for example, 4220 in FIG. 3) formed on the wheel (for example, 420 in FIG. 3); a second annular portion (for example, 4222 in FIG. 4B) which is formed on the periphery of the circular recess (for example, 4220 in FIG. 3), and which has multiple asymmetric ratchet teeth formed thereon; and at least one pawl (for example, 440 in FIG. 3) which is at least partially inserted into a recess guide channel (for example, 4320 in FIG. 3) formed on the circular plate (for example, 430 in FIG. 3), and which engages with the second annular portion (for example, 4222 in FIG. 4B). The wheel (for example, 420 in FIG. 3) includes a noncircular recess (for example, 4226 in FIG. 3) formed to be more concave than the circular recess (for example, 4220 in FIG. 3). The circular plate (for example, 430 in FIG. 3) includes a noncircular protrusion (for example, 4310 in FIG. 4B) at least partially inserted into the noncircular recess (for example, 4226 in FIG. 3).

According to various embodiments disclosed in this document, a method for operating a wearable electronic device (for example, 101 in FIG. 1) may be provided, wherein a tightening operation or a loosening operation is implemented according to the state of contact between the noncircular recess (for example, 4226 in FIG. 3) and the noncircular protrusion (for example, 4310 in FIG. 4B), the state of coupling between the pawl (for example, 440 in FIG. 3) and the second annular portion (for example, 4222 in FIG. 4B), and/or the direction of rotation of the wheel (for example, 420 in FIG. 3).

Referring to FIG. 15, according to various embodiments, in operation 1501, the wheel (for example, 420 in FIG. 3) may rotate in a first rotational direction. For example, the wheel (for example, 420 in FIG. 3) may be rotated by the user in the first rotational direction.

According to various embodiments, in operation 1503, the noncircular recess (for example, 4226 in FIG. 3) and the noncircular protrusion (for example, 4310 in FIG. 4B) may abut each other and rotate in the first rotational direction. For example, the noncircular recess (for example, 4226 in FIG. 3) and the noncircular protrusion (for example, 4310 in FIG. 4B) may be designated to contact each other when the wheel (for example, 420 in FIG. 3) rotates in the first rotational direction, during the tightening operation. If the wheel (for example, 420 in FIG. 3) rotates while the noncircular recess (for example, 4226 in FIG. 3) and the noncircular protrusion (for example, 4310 in FIG. 3) contact each other, rotational power may be directly transferred from the wheel (for example, 420 in FIG. 3) to the noncircular protrusion (for example, 4310 in FIG. 4B).

According to various embodiments, in operation 1505, the pawl (for example, 440 in FIG. 3) may move backwards toward the center of the recess guide channel (for example, 4320 in FIG. 7A). For example, when the noncircular protrusion (for example, 4310 in FIG. 4B) rotates, the second portion (for example, 4412 in FIG. 8A) of the pawl (for example, 440 in FIG. 3) may slip along the first edge (for example, 4225a in FIG. 8A) having a relative gentle inclination among asymmetric ratchet teeth, and the first portion (for example, 4411 in FIG. 8A) of the pawl (for example, 440 in FIG. 3) may slip along a symmetric edge of the recess cam structure (for example, 4223 in FIG. 8B). As a result, the pawl (for example, 440 in FIG. 3) may partially move backwards toward the center of the recess guide channel (for example, 4320 in FIG. 3) as a whole.

According to various embodiments, in operation 1507, rotational power may be transferred from the noncircular protrusion (for example, 4310 in FIG. 4B) to the band structure (for example, 300 in FIG. 3) through the spur gear (for example, 410 in FIG. 4A). During the tightening operation, the first end portion 311 of the first band (for example, 310 in FIG. 3) and the third end portion 312 of the second band (for example, 320 in FIG. 3) may approach each other. For example, if the first end portion (for example, 311 in FIG. 3) and the third end portion (for example, 321 in FIG. 3) approach, the dimension (or length) of the housing (for example, 200 in FIG. 2) may decrease.

Figure 16:
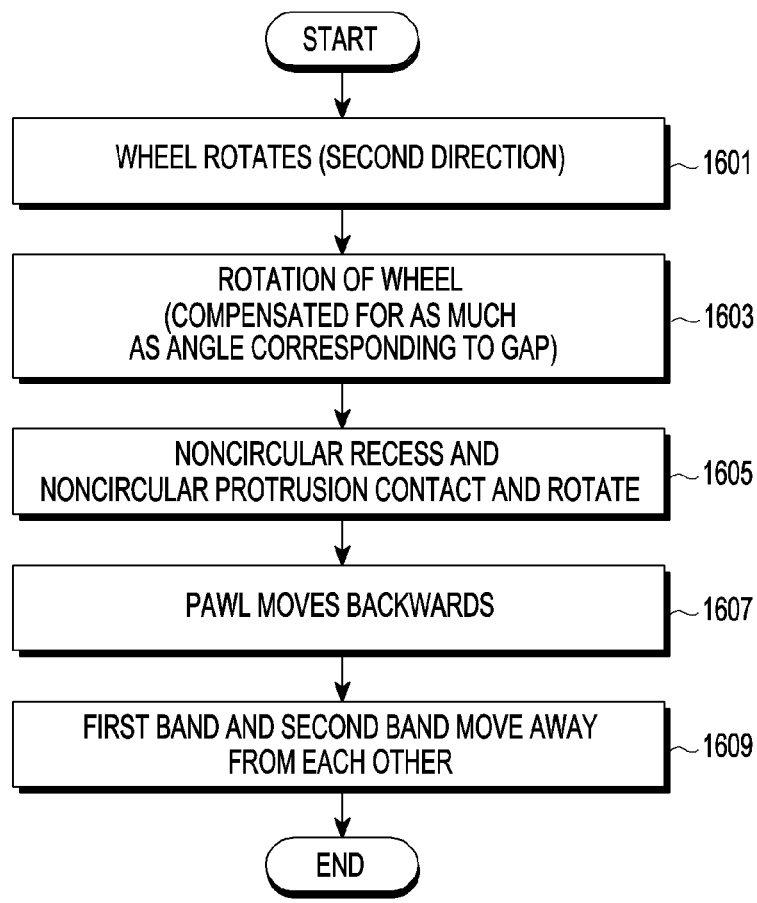
FIG. 16 is a flowchart illustrating a loosening operation according to various embodiments disclosed in this document.

Referring to FIG. 16, according to various embodiments, during the loosening operation (or first loosening operation), in operation 1601, the wheel (for example, 420 in FIG. 3) may rotate in a second rotational direction.

According to various embodiments, during the loosening operation, in operation 1603, the wheel (for example, 420 in FIG. 3) may rotate by an angle corresponding to the gap (for example, g in FIG. 11) between the noncircular recess (for example, 4226 in FIG. 3) and the noncircular protrusion (for example, 4310 in FIG. 4B).

According to various embodiments, during the loosening operation, in operation 1605, the noncircular recess (for example, 4226 in FIG. 3) and the noncircular protrusion (for example, 4310 in FIG. 4B) may abut each other and rotate in the second rotational direction.

The noncircular recess (for example, 4226 in FIG. 3) and the noncircular protrusion (for example, 4310 in FIG. 4B) may be designed so as to not to contact each other when the wheel (for example, 420 in FIG. 2) starts to rotate in the second rotational direction, during the loosening operation. If the wheel (for example, 420 in FIG. 3) is rotated while the noncircular recess (for example, 4226 in FIG. 3) and the noncircular protrusion (for example, 4310 in FIG. 4B) make no contact, rotational power may be transferred from the wheel (for example, 420 in FIG. 3) to the noncircular protrusion (for example, 4310 in FIG. 4B) after the same has rotated by an angle corresponding to the gap.

According to various embodiments, during the loosening operation, in operation 1607, the pawl (for example, 440 in FIG. 3) may be moved backwards toward the center of the recess guide channel (for example, 4320 in FIG. 3) by a rotation of the noncircular protrusion (for example, 4310 in FIG. 4B) in the second rotational direction.

According to various embodiments, when the noncircular protrusion (for example, 4310 in FIG. 4B) rotates, the second portion (for example, 4412 in FIG. 8A) of the pawl (for example, 440 in FIG. 3) may be blocked by the second edge (for example, 4225b in FIG. 8A) having a relative steep inclination among asymmetric ratchet teeth, the slip thereof may be limited thereby, and the first portion (for example, 4411 in FIG. 8A) of the pawl (for example, 440 in FIG. 3) may slip along a symmetric edge of the recess cam structure (for example, 4223 in FIG. 8B). According to various embodiments disclosed in this document, even if the second portion (for example, 4412 in FIG. 8A) is blocked by the second edge among the asymmetric ratchet teeth and thus slips limitedly, the first portion (for example, 4411 in FIG. 8A) may be formed to abut the symmetric edge and to slip at least by the designated amount of slip. Therefore, during the loosening operation, the pawl (for example, 440 in FIG. 3) may, as a whole, partially move backwards toward the center of the recess guide channel (for example, 4320 in FIG. 3).

According to various embodiments, during the loosening operation, in operation 1609, rotational power may be transferred from the noncircular protrusion (for example, 4310 in FIG. 4B) to the band structure (for example, 300 in FIG. 3) through the spur gear (for example, 410 in FIG. 4A). During the loosening operation, the first end portion (for example, 311 in FIG. 3) of the first band (for example, 310 in FIG. 3) and the third end portion (for example, 321 in FIG. 3) of the second band (for example, 320 in FIG. 3) may move away from each other.

In the case of the tightening operation, rotational power is directly transferred from the wheel (for example, 420 in FIG. 3) to the noncircular protrusion (for example, 4310 in FIG. 4B), and there is thus no time difference. In the case of the loosening operation, rotational power is transferred from the wheel (for example, 420 in FIG. 3) after being compensated for as much as the gap (for example, g in FIG. 11) between the noncircular recess (for example, 4220 in FIG. 3) and the noncircular protrusion, and a time difference may thus exist.

According to various embodiments, the first rotational direction and the second rotational direction may be opposite to each other, and whether a tightening operation or a loosening operation occurs when the wheel (for example, 420 in FIG. 3) rotates in a direction may be differently configured according to the positions in which the first edge (for example, 4225a in FIG. 8A) and the second edge (for example, 4225b in FIG. 8B) are formed among the asymmetric ratchet teeth. For example, unlike the illustrations in FIG. 11 and FIG. 12, a loosening operation may occur in the case of the first rotational direction (clockwise), and a tightening operation may occur in the case of the second rotational direction (counterclockwise).

Figure 17:
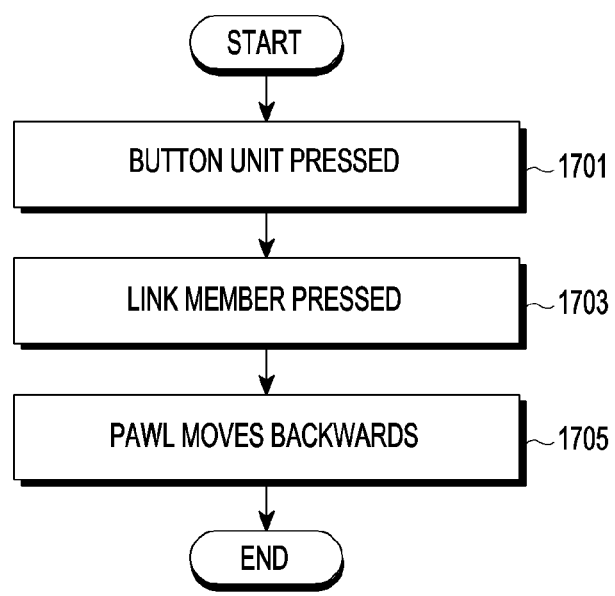
FIG. 17 is a flowchart illustrating a rapid loosening operation according to various embodiments disclosed in this document.

Referring to FIG. 17, during a rapid loosening operation (second loosening operation) according to various embodiments, in operation 710, an operation of pressing the button unit (for example, 210 in FIG. 3) may occur.

According to various embodiments, in operation 720, if the button unit is pressed, a link member (for example, 470 in FIG. 3) which is disposed inside the connector (for example, 400 in FIG. 3), and which is connected to the button unit, may be pressed.

According to various embodiments, as the link member (for example, 470 in FIG. 3) is pressed in operation 730, the pawl (for example, 440 in FIG. 3) may move backwards toward the center of the recess guide channel (for example, 4320 in FIG. 7A).

According to various embodiments, in connection with operation 1701 and operation 1703, the button unit (for example, 210 in FIG. 3) may be directly/indirectly connected to the link member (for example, 470 in FIG. 3). Accordingly, the operation of pressing the button unit (for example, 210 in FIG. 3) may be directly transferred to the link member (for example, 470 in FIG. 3). In connection with operation 1705, the link member (for example, 470 in FIG. 3) has a sloping leg (for example, 473 in FIG. 13) formed thereon, and the pawl (for example, 440 in FIG. 3) has a sloping groove (for example, 4422 in FIG. 5) and a sloping surface (for example, 4421 in FIG. 5) formed thereon. Accordingly, as a result of an operation of vertically pressing the link member (for example, 470 in FIG. 3), the pawl (for example, 440 in FIG. 3) may move horizontally toward the center of the recess guide channel (for example, 4320 in FIG. 3).

The rapid loosening operation according to various embodiments may guarantee that, while the button unit (for example, 210 in FIG. 3) is pressed, the pawl (for example, 440 in FIG. 3) always maintains the state in which the same has moved backwards toward the center of the recess guide channel (for example, 4320 in FIG. 3). Therefore, if the wheel 420 rotates in the loosening direction while the button unit (for example, 210 in FIG. 3) is pressed, the loosening operation may be rapidly implemented regardless of whether or not the end portion of the pawl (for example, 440 in FIG. 3) engages with the asymmetric ratchet teeth.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in this document, there may be provide a wearable electronic device including: a housing containing electronic components; and a band structure, wherein the band structure includes: a first band including a first end portion connected to a first region of the housing and a second end portion including a first rack gear; a second band including a third end portion connected to a second region of the housing and a fourth end portion including a second rack gear parallel to the first rack gear; and an adjustable connector moveable engaged with the second end portion and the fourth end portion, such that the housing, the first band, the connector, and the second band together form a closed loop, wherein the connector includes: a connector housing structure; a spur gear disposed inside the connector housing structure, wherein the spur gear being is positioned between the first rack gear and the second rack gear so as to rotatably engage therewith; and a wheel coaxial with the spur gear and partially exposed through the connector housing structure to be able to rotate from outside the connector housing structure, wherein the wheel includes: a first surface facing the first rack gear and the second rack gear; and a second surface facing away from the first surface, wherein the second surface includes a circular recess forming an annular inner wall including a first annular portion, wherein the first annular portion includes a first recessed cam structure and a second recessed cam structure disposed in opposite directions, each of the first recessed cam structure and the second recessed cam structure having symmetric edges, wherein the connector housing structure includes a second annular portion, the second annular portion forming an inner ratchet ring including asymmetric ratchet teeth having a first edge with a first slope and a second edge with a second slope larger than the first slope, a circular plate at least partially disposed in the circular recess, wherein the circular plate is coaxially connected to the spur gear, and includes a recess guide channel extending in a diameter direction of the circular plate, a first pawl configured to be able to moveable in the diameter direction inside the guide channel between the first recessed cam structure and the second recessed cam structure, wherein the first pawl includes a first end surface, wherein the first end surface includes: a first portion having a first shape corresponding to and engaged with the first recessed cam structure; and a second portion having a second shape corresponding to and engaged with one of the asymmetric ratchet teeth, a second pawl configured to be moveable in the diameter direction inside the guide channel between the first pawl and the second recessed cam structure, wherein the second pawl includes a second end surface, wherein the second end surface includes: a third portion having a third shape corresponding to and engaged with the second recessed cam structure; and a fourth portion having the second shape, wherein the ratchet ring, the second portion, and the fourth portion are configured to allow the wheel to rotate in a first rotation direction and to prevent the wheel from rotating in a second rotational direction opposite to the first rotational direction, and wherein the first recessed cam structure, the second recessed cam structure, the first portion, and the second portion are configured to allow the wheel to rotate in the second rotational direction by means of a force acting such that the first pawl and the second pawl move away from the ratchet ring.

According to various embodiments, the connector may further includes an elastic member between the first pawl and the second pawl.

According to various embodiments, the wheel may includes an opening which is coaxial with the circular recess, and may be connected to the first band and the second band through the spur gear and the opening.

According to various embodiments, the wheel may further includes a noncircular recess formed from the circular recess toward the spur gear to be more concave than the circular recess.

According to various embodiments, the circular plate may includes a noncircular protrusion protruding toward the spur gear, and the protrusion may be at least partially disposed in the noncircular recess.

According to various embodiments, a first edge of the noncircular protrusion and a first edge of the noncircular recess may be shaped so as to contact each other while the wheel is rotated in the first rotational direction.

According to various embodiments, the first edge of the noncircular protrusion and the first edge of the noncircular recess may be shaped so as not to contact each other while the wheel is rotated in the second rotational direction.

According to various embodiments, a second edge of the noncircular protrusion and a second edge of the noncircular recess may be shaped to contact each other while the wheel is rotated in the first rotational direction.

According to various embodiments, the second edge of the noncircular protrusion and the second edge of the noncircular recess may be shaped so as not to contact each other while the wheel is rotated in the second rotational direction.

According to various embodiments, a button unit may be formed in a third region between the first region and the second region of the housing.

According to various embodiments, the wearable electronic device may include a link member connecting the button unit and the connector.

According to various embodiments, the link member may include: a first surface facing the first pawl and the second pawl; a second surface facing away from the first surface facing the first pawl and the second pawl; and a sloping leg configured to slide along a sloping surface formed inside the first pawl and the second pawl.

According to various embodiments, the link member may move the first pawl and the second pawl backwards toward the center of the recess guide channel, in connection with an operation of pressing the button unit.

According to various embodiments, the first annular portion may be stacked with the second annular portion.

According to various embodiments, the second annular portion may be provided by being bonded, fastened, or fitted between the wheel and the circular plate, or is integrally formed with the first annular portion.

According to various embodiments disclosed in this document, there may be provided a wearable electronic device including: a housing containing electronic components; at least one band; and a connector capable of adjusting a relative position with the band, wherein the connector includes: a connector housing; a spur gear engaging with at least a part of the band; a wheel which is disposed inside the connector housing, which is coaxial with the spur gear, and which is at least partially exposed to the outside of the connector housing; a circular plate which is coaxial with the wheel, and which is at least partially inserted into a circular recess formed on the wheel; and a first pawl at least partially inserted into a recess guide channel formed on the circular plate so as to correspond to and engage with the shape of the inner peripheral surface of the circular recess.

According to various embodiments, asymmetric ratchet teeth may be formed on the inner peripheral surface of the connector housing.

According to various embodiments, a recess cam structure having a symmetric edge may be formed on the inner peripheral surface of the circular recess so as to constitute a stacked structure with the asymmetric ratchet teeth. The end surface on one side of the first pawl may be shaped to correspond to and engage with the asymmetric ratchet teeth and the recess cam structure.

According to various embodiments, a noncircular recess may be formed in the circular recess to be more concave than the circular recess. The circular plate may have a noncircular protrusion formed thereon and at least partially inserted into the noncircular recess.

According to various embodiments disclosed in this document, there may be provided a wearable electronic device including: at least one band; and a connector capable of adjusting a relative position with the band, wherein the connector includes a ratchet structure having asymmetric ratchet teeth and a recess cam structure having a symmetric edge, and wherein the connector includes a first pawl, a part of which corresponds to and engages with the ratchet structure, and at least another part of which engages with the recess cam structure.

Embodiments disclosed in this document are presented to describe and understand the disclosed technical contents, without limiting the scope of technologies disclosed in this document. Therefore, the scope of this document is to be interpreted as including all modifications based on the technical idea of this document or various other embodiments.

The invention claimed is:

1. A wearable electronic device comprising:
a housing containing electronic components; and
a band structure, wherein the band structure includes:
  a first band including a first end portion connected to a first region of the housing and a second end portion including a first rack gear;
  a second band including a third end portion connected to a second region of the housing and a fourth end portion including a second rack gear parallel to the first rack gear; and
  an adjustable connector moveably engaged with the second end portion and the fourth end portion, such that the housing, the first band, the connector, and the second band together form a closed loop, wherein the connector includes:
    a connector housing structure;
    a spur gear disposed inside the connector housing structure, wherein the spur gear is positioned between the first rack gear and the second rack gear so as to rotatably engage therewith; and
    a wheel coaxial with the spur gear and partially exposed through the connector housing structure to be able to rotate from outside the connector housing structure, wherein the wheel comprises:
      a first surface facing the first rack gear and the second rack gear; and
      a second surface facing away from the first surface,
    wherein the second surface comprises a circular recess forming an annular inner wall including a first annular portion,
    wherein the first annular portion comprises a first recessed cam structure and a second recessed cam structure disposed in opposite directions, each of the first recessed cam structure and the second recessed cam structure having symmetric edges,
    wherein the connector housing structure includes a second annular portion, the second annular portion forming an inner ratchet ring comprising asymmetric ratchet teeth having a first edge with a first slope and a second edge with a second slope larger than the first slope,
    a circular plate at least partially disposed in the circular recess, wherein the circular plate is coaxially connected to the spur gear, and includes a recess guide channel extending in a diameter direction of the circular plate,
    a first pawl configured to be moveable in the diameter direction inside the guide channel between the first recessed cam structure and the second recessed cam structure, wherein the first pawl includes a first end surface, wherein the first end surface comprises:
      a first portion having a first shape corresponding to and engaged with the first recessed cam structure; and
      a second portion having a second shape corresponding to and engaged with one of the asymmetric ratchet teeth,
    a second pawl configured to be moveable in the diameter direction inside the guide channel between the first pawl and the second recessed cam structure, wherein the second pawl includes a second end surface, wherein the second end surface includes:
      a third portion having a third shape corresponding to and engaged with the second recessed cam structure; and
      a fourth portion having the second shape,
    wherein the ratchet ring, the second portion, and the fourth portion are configured to allow the wheel to rotate in a first rotation direction and to prevent the wheel from rotating in a second rotational direction opposite to the first rotational direction, and
    wherein the first recessed cam structure, the second recessed cam structure, the first portion, and the second portion are configured to allow the wheel to rotate in the second rotational direction by means of a force acting such that the first pawl and the second pawl move away from the ratchet ring.

2. The wearable electronic device of claim 1, wherein the connector further includes an elastic member between the first pawl and the second pawl.

3. The wearable electronic device of claim 1, wherein the wheel includes an opening which is coaxial with the circular recess, and is connected to the first band and the second band through the spur gear and the opening.

4. The wearable electronic device of claim 1, wherein the wheel further includes a noncircular recess formed from the circular recess toward the spur gear to be more concave than the circular recess.

5. The wearable electronic device of claim 4, wherein the circular plate includes a noncircular protrusion protruding toward the spur gear, and the noncircular protrusion is at least partially disposed in the noncircular recess.

6. The wearable electronic device of claim 5, wherein a first edge of the noncircular protrusion and a first edge of the noncircular recess are shaped to contact each other while the wheel is rotated in the first rotational direction.

7. The wearable electronic device of claim 6, wherein the first edge of the noncircular protrusion and the first edge of the noncircular recess are shaped not to contact each other while the wheel is rotated in the second rotational direction.

8. The wearable electronic device of claim 7, wherein a second edge of the noncircular protrusion and a second edge of the noncircular recess are shaped to contact each other while the wheel is rotated in the first rotational direction.

9. The wearable electronic device of claim 8, wherein the second edge of the noncircular protrusion and the second edge of the noncircular recess are shaped not to contact each other while the wheel is rotated in the second rotational direction.

10. The wearable electronic device of claim 1, wherein a button unit is formed in a third region between the first region and the second region of the housing.

11. The wearable electronic device of claim 10, comprising a link member connecting the button unit and the connector.

12. The wearable electronic device of claim 11, wherein the link member comprises:

a first surface facing the first pawl and the second pawl;

a second surface facing away from the first surface facing the first pawl and the second pawl; and a sloping leg configured to slide along a sloping surface formed inside the first pawl and the second pawl.

13. The wearable electronic device of claim 11, wherein the link member may move the first pawl and the second pawl backwards toward the center of the recess guide channel, in connection with an operation of pressing the button unit.

14. The wearable electronic device of claim 1, wherein the first annular portion is stacked with the second annular portion.

15. The wearable electronic device of claim 1, wherein the second annular portion is provided by being bonded, fastened, or fitted between the wheel and the circular plate, or is integrally formed with the first annular portion.

* * * * *